(12) United States Patent
Gao et al.

(10) Patent No.: US 11,491,394 B2
(45) Date of Patent: Nov. 8, 2022

(54) MOBILE VIDEO GAME CONTROLLER

(71) Applicant: Performance Designed Products LLC, San Diego, CA (US)

(72) Inventors: Yun Gao, San Diego, CA (US); Conor Bodily, San Diego, CA (US); Angel Monzalvo, San Diego, CA (US); Antonio Meneses, Chula Vista, CA (US)

(73) Assignee: Performance Designed Products LLC, San Diego, CA (US)

( * ) Notice: Subject to any disclaimer, the term of this patent is extended or adjusted under 35 U.S.C. 154(b) by 0 days.

(21) Appl. No.: 17/302,420

(22) Filed: May 3, 2021

(65) Prior Publication Data

US 2021/0346794 A1    Nov. 11, 2021

Related U.S. Application Data

(60) Provisional application No. 63/020,133, filed on May 5, 2020.

(51) Int. Cl.
*A63F 13/24*    (2014.01)

(52) U.S. Cl.
CPC .................................. *A63F 13/24* (2014.09)

(58) Field of Classification Search
None
See application file for complete search history.

(56) References Cited

U.S. PATENT DOCUMENTS

| | | | |
|---|---|---|---|
| 7,580,728 B2* | 8/2009 | Vance | A63F 13/98 455/575.1 |
| 9,138,640 B2* | 9/2015 | Baum | A63F 13/235 |
| 10,143,921 B1* | 12/2018 | Strahle | A63F 13/424 |
| 10,150,029 B2* | 12/2018 | Yamano | G06F 1/266 |
| 2002/0155890 A1* | 10/2002 | Ha | A63F 13/28 463/36 |
| 2004/0137983 A1* | 7/2004 | Kerr | A63F 13/92 463/29 |
| 2005/0176461 A1 | 8/2005 | Bozzone et al. | |

(Continued)

FOREIGN PATENT DOCUMENTS

| | | |
|---|---|---|
| CN | 205391705 U | 7/2016 |
| KR | 10-2014-0024234 A | 2/2014 |

OTHER PUBLICATIONS

Rotor Riot Gaming Controller—L3 and R3 on iOS, AppleInsider, Aug. 19, 2019, https://www.youtube.com/watch?v=xEBEvBzRyk4, p. 1 (Year: 2019).*

(Continued)

*Primary Examiner* — Tramar Harper
(74) *Attorney, Agent, or Firm* — Knobbe, Martens, Olson & Bear LLP

(57) ABSTRACT

A video game controller for use with a smartphone includes a top panel hinged relative to a bottom panel, with the bottom panel having control inputs for playing video games. The top panel folds onto a bottom panel in a closed configuration to easily fit in a pocket of the user's garment, such as pants pocket, shirt pocket, jacket pocket, etc.). The top panel pivots relative to the bottom panel to an open configuration to support the smartphone on the top panel during use irrespective of the size of the smartphone.

14 Claims, 20 Drawing Sheets

(56) References Cited

U.S. PATENT DOCUMENTS

| | | | | |
|---|---|---|---|---|
| 2007/0174531 A1* | 7/2007 | Liberty | ............... | G06F 1/1632 |
| | | | | 710/303 |
| 2009/0111508 A1* | 4/2009 | Yeh | ............... | G06F 1/1624 |
| | | | | 455/575.8 |
| 2011/0039608 A1* | 2/2011 | Hsiao | ............... | H04M 1/72409 |
| | | | | 455/575.3 |
| 2013/0341214 A1* | 12/2013 | King | ............... | A63F 13/98 |
| | | | | 206/216 |
| 2014/0302921 A1* | 10/2014 | Smith | ............... | A63F 13/23 |
| | | | | 463/31 |
| 2014/0364232 A1* | 12/2014 | Cramer | ............... | A63F 13/98 |
| | | | | 463/37 |
| 2015/0031452 A1* | 1/2015 | Rundell | ............... | A63F 13/23 |
| | | | | 463/31 |
| 2015/0174482 A1* | 6/2015 | Hirshberg | ............... | A63F 13/92 |
| | | | | 463/37 |
| 2015/0202530 A1* | 7/2015 | Zheng | ............... | H04M 1/04 |
| | | | | 463/31 |
| 2019/0379231 A1* | 12/2019 | Gonzalez | ............... | H02J 7/025 |
| 2020/0282309 A1* | 9/2020 | Liao | ............... | A63F 13/92 |
| 2020/0353351 A1* | 11/2020 | Mao | ............... | A63F 13/235 |
| 2021/0275907 A1* | 9/2021 | Khaira | ............... | A63F 13/24 |
| 2021/0291038 A1* | 9/2021 | Guerrero, Jr. | ............... | A63F 13/24 |

OTHER PUBLICATIONS

International Search Report and Written Opinion received for International Patent Application No. PCT/US2021/030186, dated Aug. 18, 2021, in 11 pages.

* cited by examiner

MOBILE VIDEO GAME CONTROLLER

CROSS-REFERENCE TO RELATED APPLICATIONS

Any and all applications for which a foreign or domestic priority claim is identified in the Application Data Sheet as filed with the present application are hereby incorporated by reference under 37 CFR 1.57, and should be considered a part of this specification.

BACKGROUND

Field

The present invention is directed to video game controllers, and more particularly to mobile video game controllers for use with smartphones.

Description of the Related Art

Video gaming is very popular, and increasingly video games are played on smartphones, allowing users to play games anywhere. However, mobile games (e.g., video games played on smartphones) are becoming increasingly more complex, especially without the control inputs typically found on a handheld video game controller used with a console at home. Existing mobile video game controllers suffer from a variety of drawbacks, including unreliable connectivity, latency in operation, non-universal compatibility with smartphones, and bulkiness or lack of portability.

SUMMARY

In accordance with one aspect of the disclosure, an improved video game controller for use with a smartphone (e.g., a mobile video game controller) is provided that provides universal compatibility with different smartphones, reliable connectivity and easy portability. In a further aspect of the disclosure, the mobile video game controller can have improved pocketability (e.g., have a low form factor that allows it to easily fit in a pocket of the user's garment, such as pants pocket, shirt pocket, jacket pocket, etc.).

In accordance with another aspect of the disclosure, a mobile video game controller is provided. The mobile video game controller comprises a controller body. The controller body comprises a top panel configured to removably couple to a smartphone to support and retain the smartphone thereon. The top panel has a slot that receives a connector coupleable to the smartphone irrespective of a size or shape of the smartphone. The top panel supports a controller cable having a connector that removably couples to a power connector of the smartphone to electrically connect the controller to the smartphone. The controller body also comprises a bottom panel having a plurality of control inputs operable to control one or more operations of a video game, and a processor configured to convert one or more operations of the plurality of control inputs into electrical signals and to communicate such signals to the smartphone. The bottom panel also comprises an audio jack configured to receive an audio connector for a headset and configured to communicate with the processor, and a power jack configured to connect to a power source via a power cable. The processor is configured to pass power from the power source through to the smartphone connected to the controller cable. The controller body also comprises a hinge movably connecting the top panel with the bottom panel. The hinge comprises one or more friction hinge components that allow the top panel to be positioned in one or more locked positions relative to the bottom panel. The hinge allows the top panel to be rotated over approximately 360 degrees relative to the bottom panel, the controller cable routed via the hinge between the top and bottom panels to electrically connect the controller cable to the processor.

In accordance with another aspect of the disclosure, a mobile video game controller is provided. The mobile video game controller comprises a controller body with a top panel and a bottom panel. The top panel is configured to removably couple to a smartphone to support and retain the smartphone thereon between an upper bracket and a lower bracket irrespective of a size or shape of the smartphone. The top panel supports a controller cable having a connector that removably couples to a power connector of the smartphone to electrically connect the controller to the smartphone. The bottom panel comprises a plurality of control inputs operable to control one or more operations of a video game, a processor configured to convert one or more operations of the plurality of control inputs into electrical signals and to communicate such signals to the smartphone, and an audio jack configured to receive an audio connector for a headset and configured to communicate with the processor. A hinge movably connects the top panel with the bottom panel to allow the top panel to be pivoted between a closed position relative to the bottom panel and an open position relative to the bottom panel, the controller cable routed via the hinge between the top and bottom panels to electrically connect the controller cable to the processor.

DETAILED DESCRIPTION

Figure 1A:
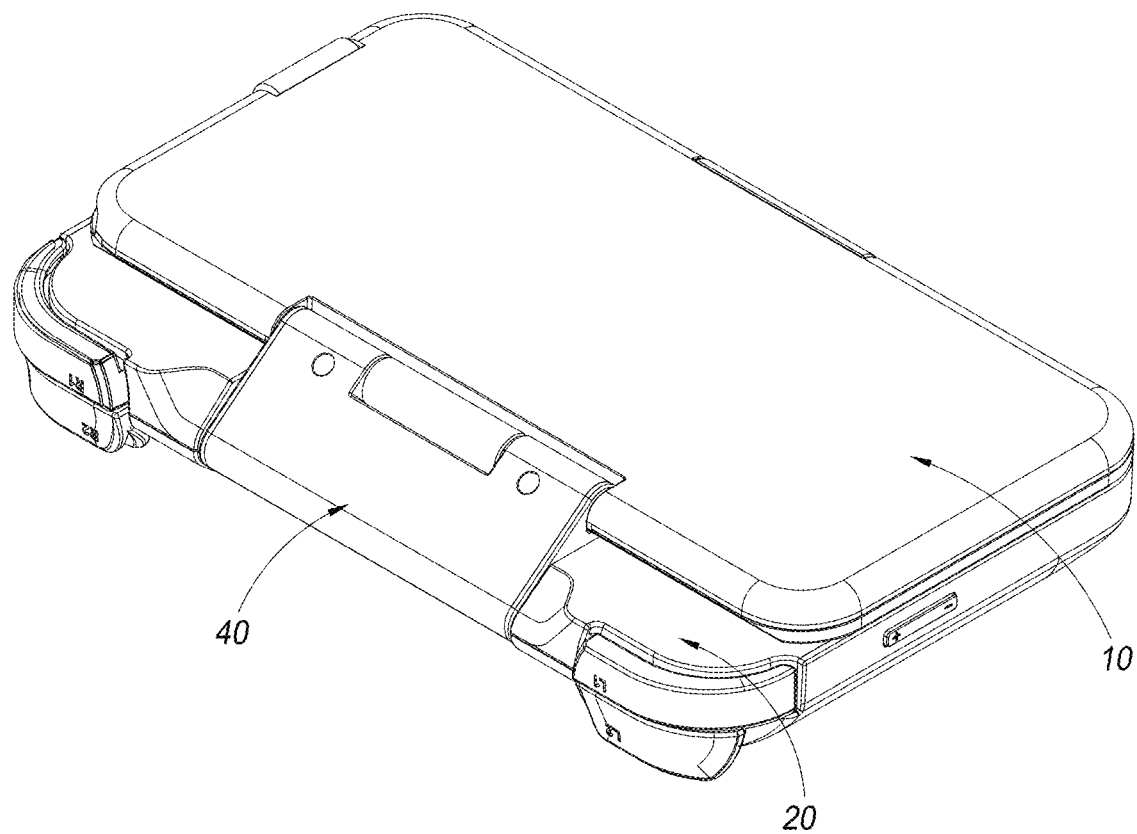
FIGS. 1A-1D are schematic views of a mobile video game controller in various positions.

FIGS. 1A-11 show a mobile video game controller 100 (hereafter "the controller") for use with a smartphone 200 that can be removably coupled to the controller 100. The controller 100 has a top panel 10 and a bottom panel 20 connected by a hinge 40, allowing the top panel 10 to be swiveled relative to the bottom panel 20.

The controller 100 has the form of a case (e.g. a phone case) with smooth (e.g., planar) top and bottom outer surfaces and rounded corners. In the illustrated figures, the controller 100 has a generally rectangular shape when in the closed position with a compact form factor (e.g., relatively small thickness when in the closed position where the top panel 10 is adjacent the bottom panel 20), advantageously providing improved portability and pocketability of the controller 100 (e.g., allowing the controller 100 to be stored in a garment pocket of the user, such as a pants pocket, shirt pocket or jacket pocket, while in the closed position). The controller 100 allows the smartphone to operate as a gaming console to play video games accessed via the smartphone 200 (e.g., cloud or online games). As such, the controller 100 is a phone console mobile controller.

Figure 1B:
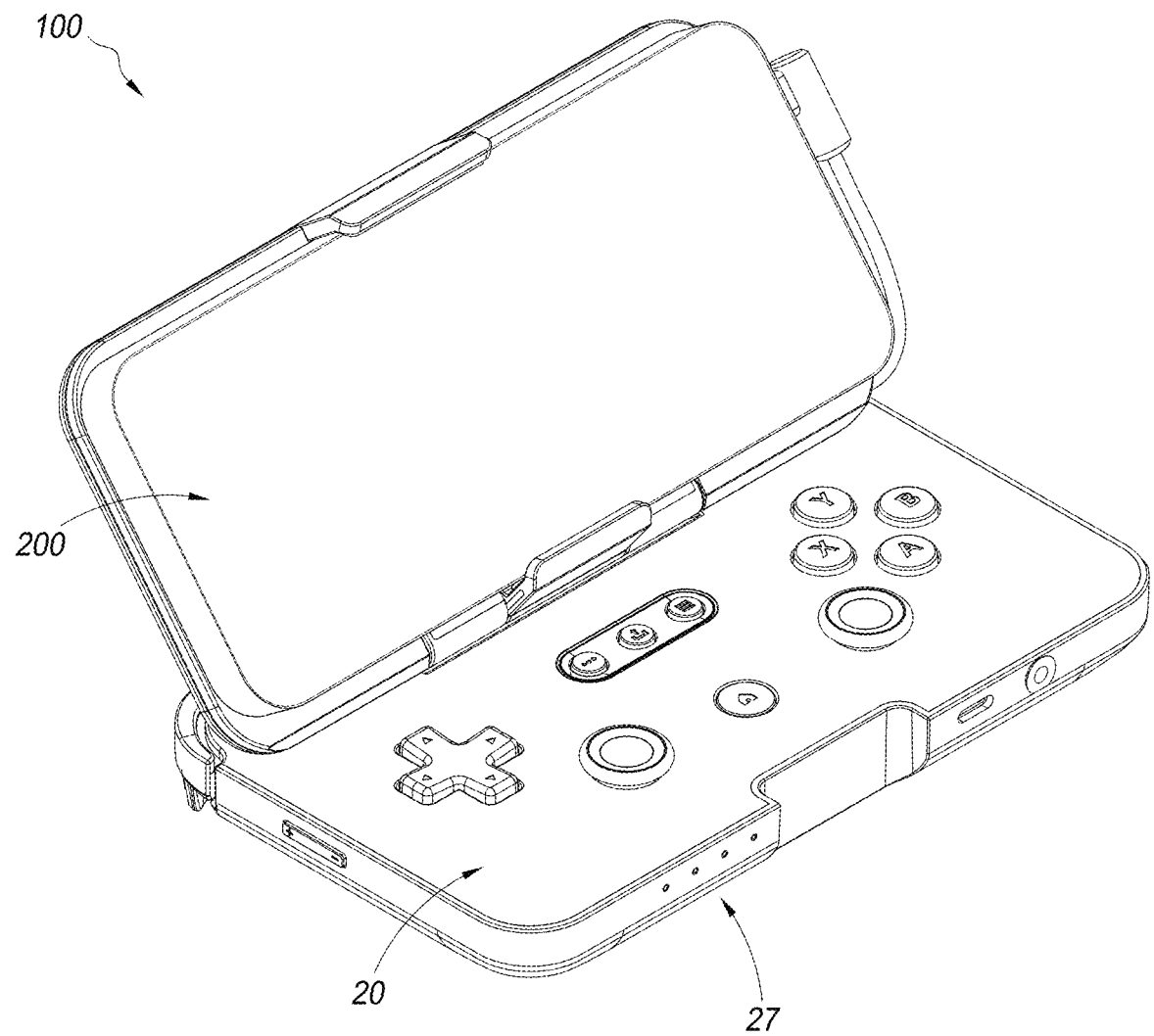
Figure 1C:
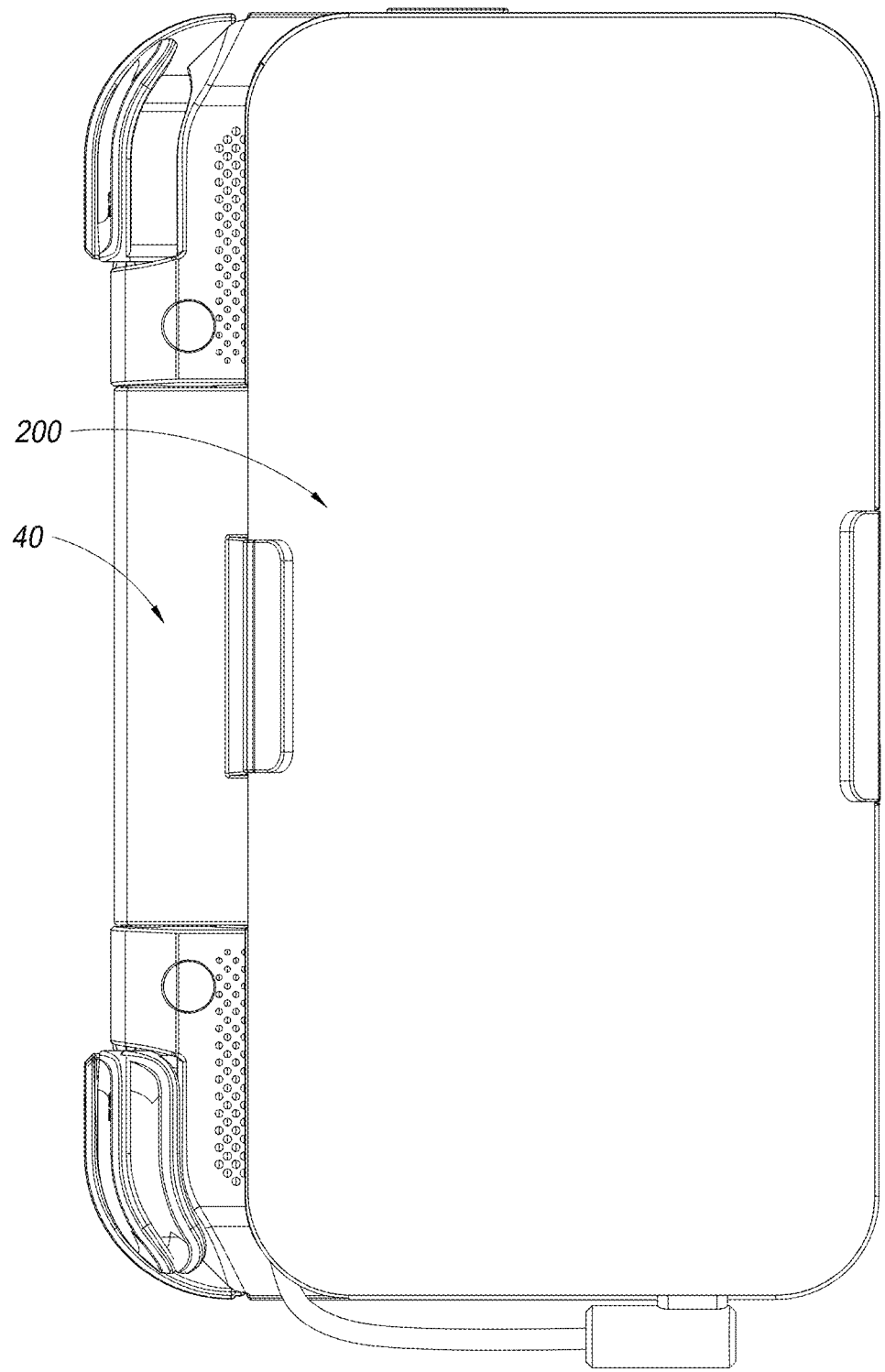
Figure 1D:
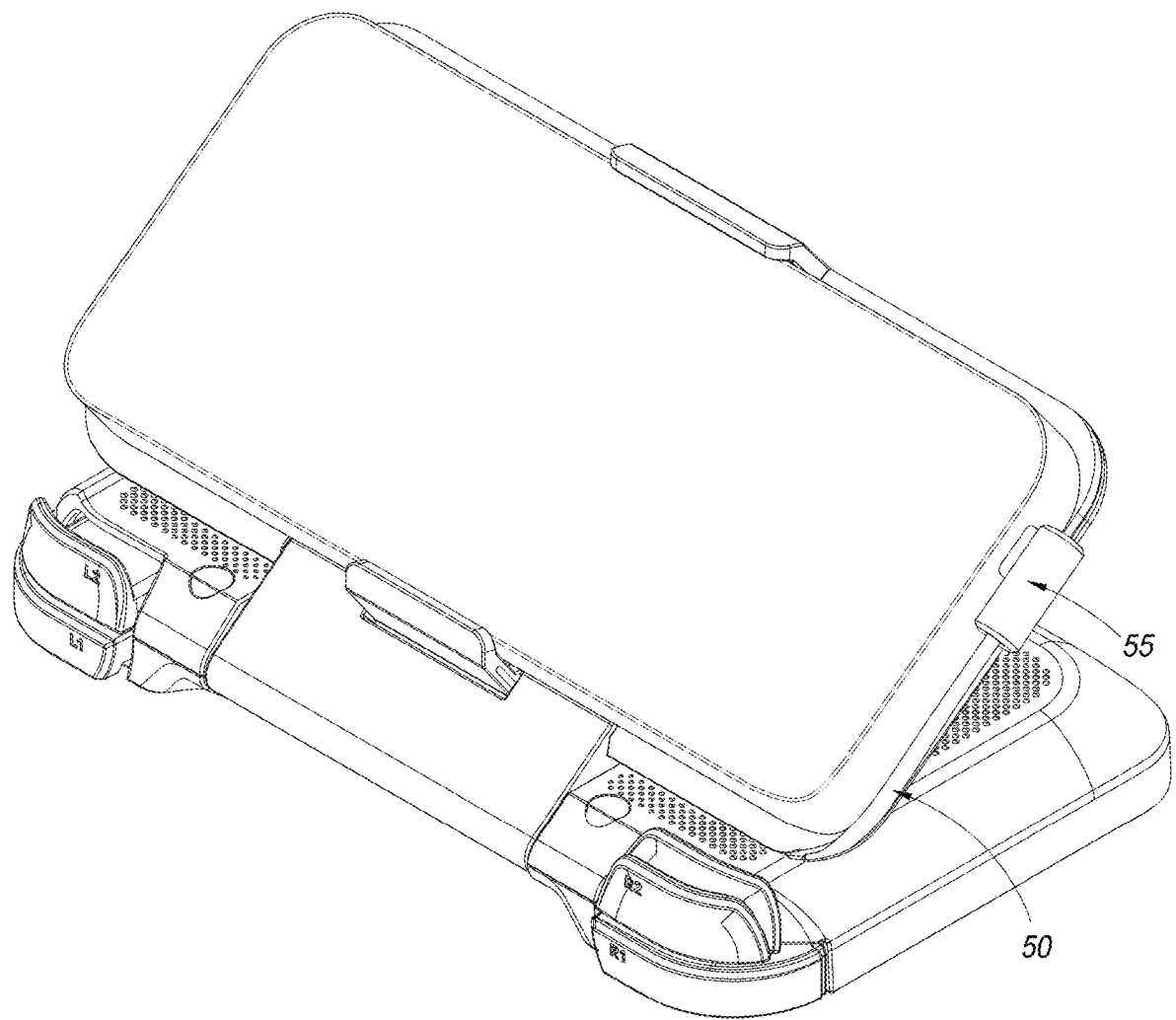

FIG. 1A shows the controller 100 in a closed position with the top panel 10 adjacent (e.g., folded over) the bottom panel 20. FIG. 1B shows the controller in an open position with the top panel 10 extending at an angle (e.g., obtuse angle greater than 90 degrees, such as 120 degrees) relative to the bottom panel 20, with the smartphone 200 attached to the top panel 10 and used in a gaming mode. FIG. 1C shows the controller 100 oriented in a vertical direction (e.g., along the major axis of the controller 100) with the smartphone 200 attached to the top panel 10, which allows a user to use the smartphone 200 (e.g., in a non-gaming mode) in a phone mode while the controller 100 supports the smartphone 200 (e.g., in an upright position) on a support surface (e.g., a table). FIG. 1D shows the controller 100 with the top panel 10 rotated more than 180 degrees (e.g., approximately 230-280 degrees) relative to the bottom panel 20, allowing the user to use the smartphone 200 in a media mode (e.g., to watch videos) while the controller 100 supports the smartphone 200 on a support surface (e.g., a table).

The controller 100 includes a cable 50 with a connector 55 that connects to the power jack of the smartphone 200. The controller 100 (e.g., electronics in the controller 100, control inputs 22) communicate with the smartphone 200 via the connector 55 once it is coupled to the power jack of the smartphone 200. The controller 100 (e.g., the electronics in the controller, the control inputs 22) are powered by power communicated from the smartphone 200 to the controller 100 via the cable 50 and connector 55. That is, in one implementation, the controller 100 does not have its own power source (e.g., there are no batteries in the controller 100).

Figure 2:
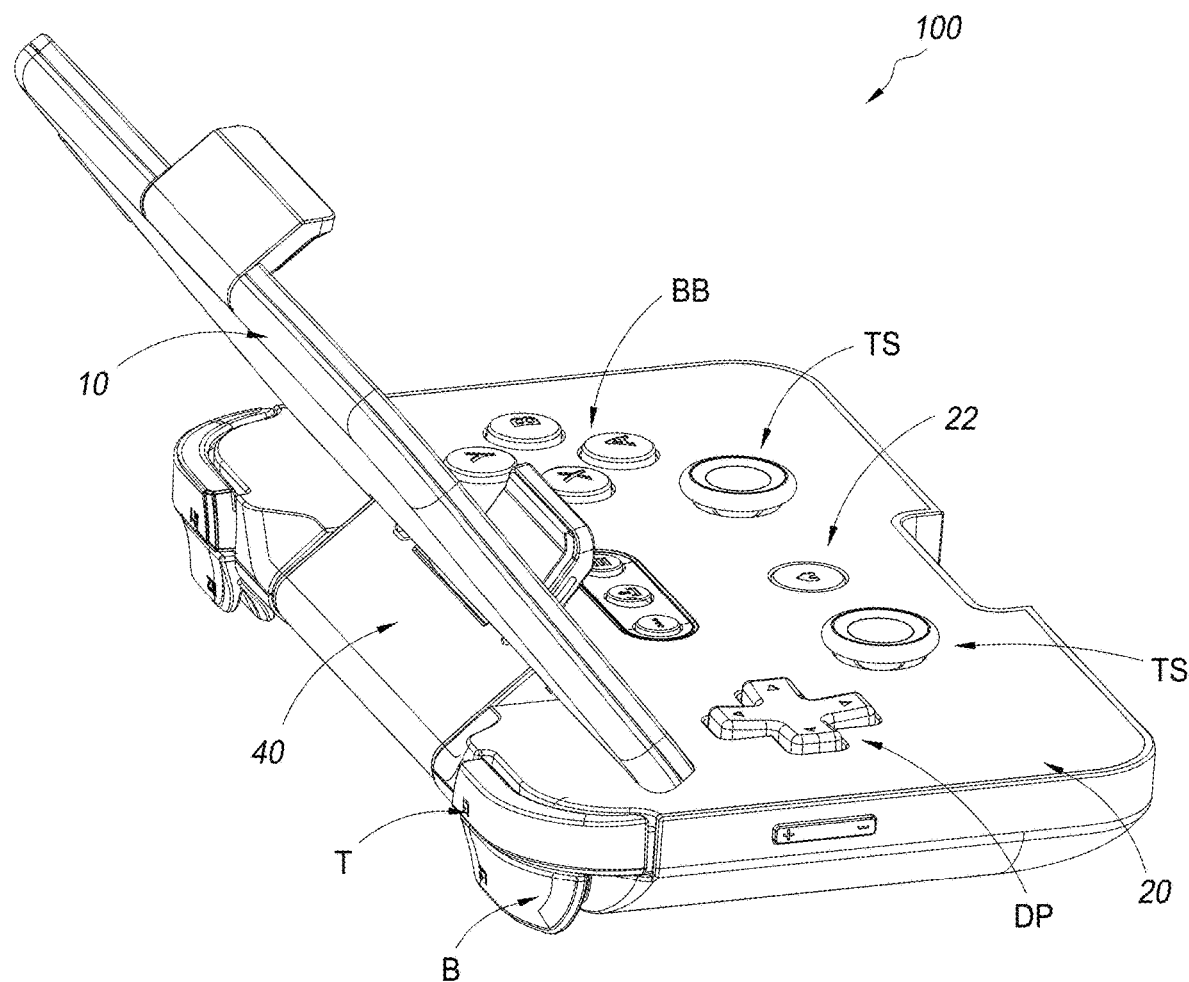
FIG. 2 is a perspective rear view of the mobile video game controller of FIG. 1A in one position.
Figure 3:
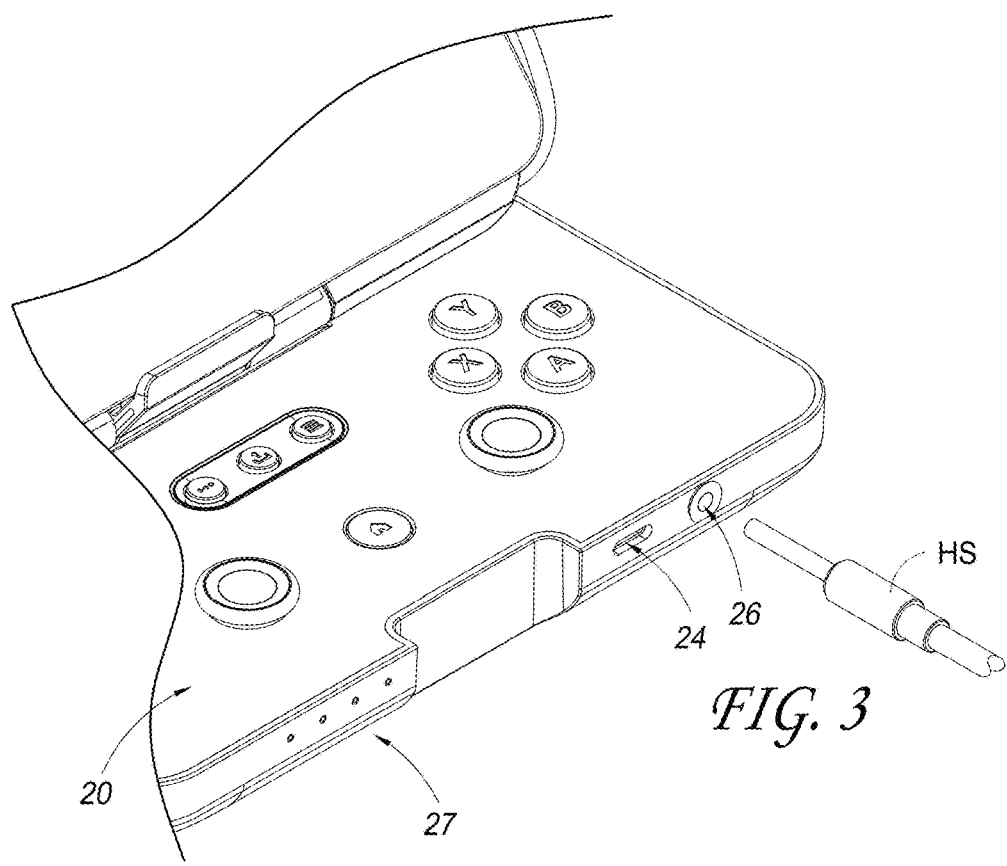
FIG. 3 is a partial schematic view of the mobile video game controller of FIG. 1A.
Figure 4:
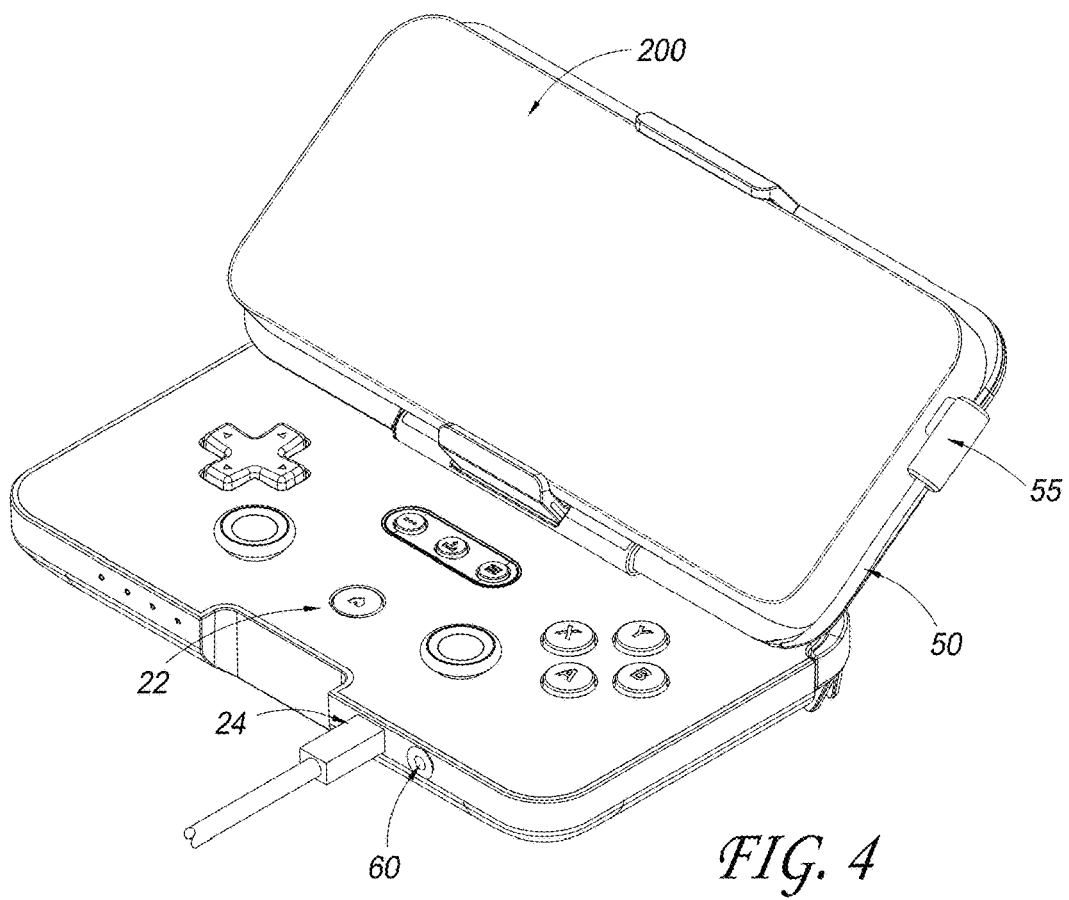
FIG. 4 is a perspective front view of the mobile video game controller of FIG. 1A.
Figure 5:
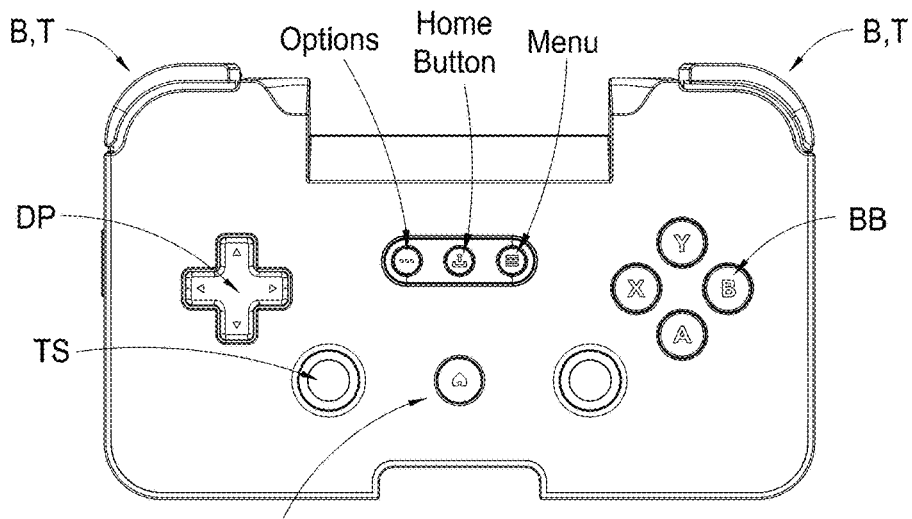
FIG. 5 is a top view of a portion of the video game controller of FIG. 1A.

With reference to FIGS. 2-4, the controller 100 has one or more (e.g., multiple) control inputs 22 on the bottom panel 20 that the user can operate to play the video game on the smartphone 200. The control inputs 22 can include one or more buttons BB, directional pads or D-pads DP, thumbsticks TS, etc. (e.g., digital buttons, digital bumpers B, analog triggers T, analog joysticks with digital center push button, home button, options button, menu button). In one implementation, the control inputs 22 can be arranged in a console layout similar to typical video game controllers, allowing the user to easily and intuitively operate the control inputs 22 while playing a video game on the smartphone 200 while it's connected to the controller 100. The control inputs 22 can be symmetrically arranged about a centerline of the bottom panel 20 across a width of the bottom panel 20 between a front and a rear edge of the bottom panel 20 (see FIG. 5). The control inputs 22 allow the user to engage in complex game play and execute complex moves in video games played on the smartphone 200. The controller 100 can also have one or more lighting elements 27, such as light emitting diodes (LEDs) (e.g., four LEDs), adjacent an edge of the bottom panel 20, as best shown in FIG. 5.

The controller 100 has an audio jack 24 (e.g., 3.5 mm 4-pole audio jack) for connecting a headset cable HS of a headset (not shown), allowing the user to play video games more discretely (e.g., while on the subway, airplane, train, taxi, etc.). The audio jack 24, when the headset is connected to it, also allows for the user to experience low-latency audio while playing a video game.

The controller 100 has a connector 26 for connecting a power cable 60 (see FIG. 4). The cable 60 can be connected to power source (e.g. wall outlet, computer USB-A or USB-C connector, APPLE® LIGHTNING® connector). Electronics in the controller 100 pass power from the power source via the cable 60 to the smartphone 200 via the cable 50 and connector 55 to power the smartphone 200 (e.g., charge the battery of the smartphone 200). That is, the controller 100 allows for pass through power from the power source to the smartphone 200 to power the smartphone 200 (e.g., while operating the controller 100 during gaming, for extended gaming use of the controller 100). The connector 26 can in one implementation be a Universal Serial Bus type C (USB-C) connector. However, the connector 26 can be other suitable electrical connectors (e.g., APPLE® LIGHTNING® connector).

Figure 6A:
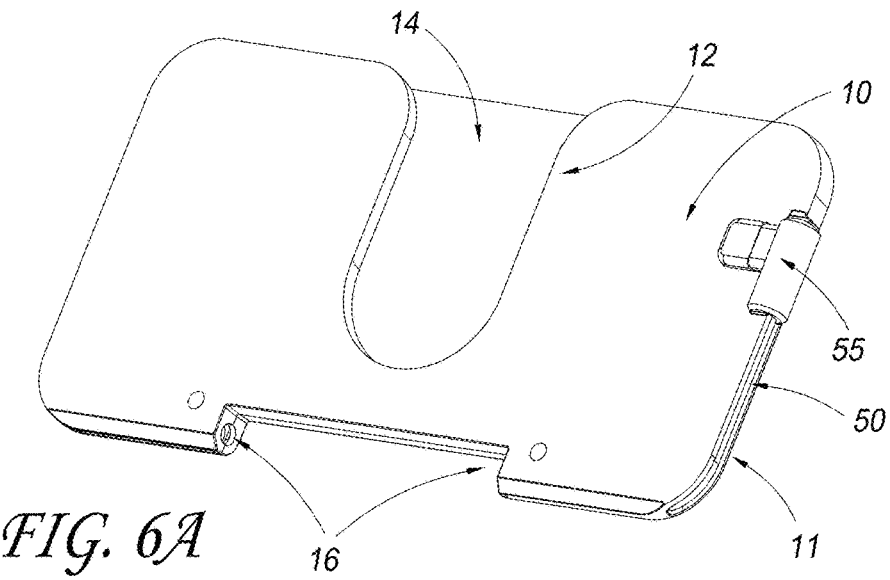
FIGS. 6A-6B are perspective front and rear views of a portion of the mobile video game controller of FIG. 1A.
Figure 6B:
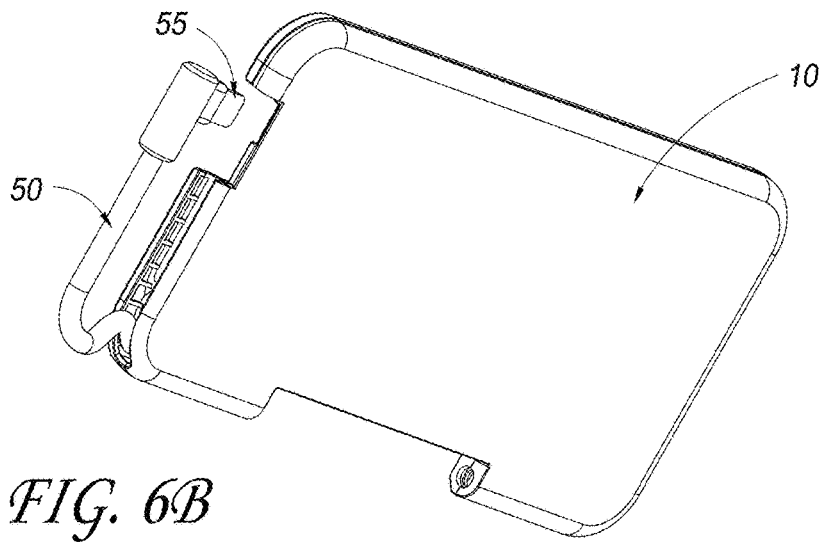
Figure 11:
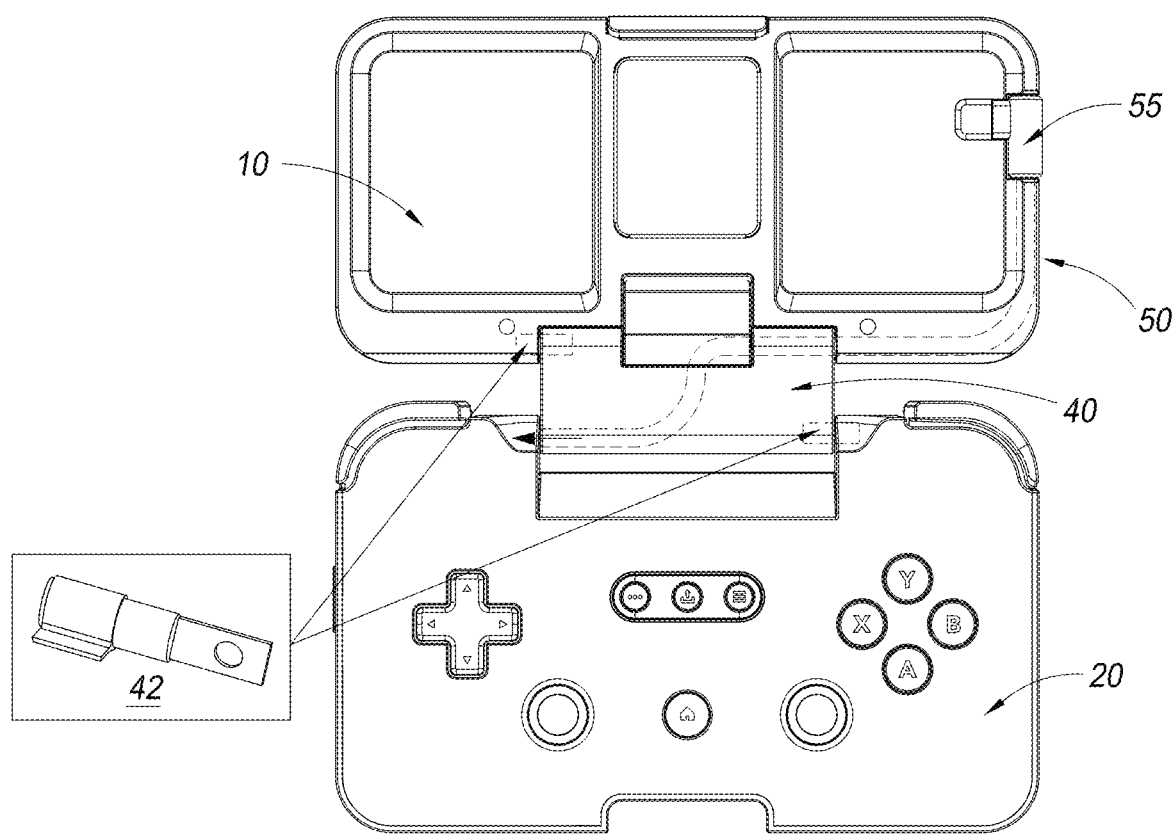
FIG. 11 is a top view of the mobile video game controller of FIG. 1A in an open position.

FIGS. 6A-6B show a front perspective and a rear perspective view top panel 10, respectively. The top panel 10 has a slot 12 defined relative to a rear plate 14 of the top panel 10. In one implementation, the slot 12 can be U shaped, with an open end at an edge of the top panel 10 and a closed end toward an opposite edge of the top panel 10. The cable 50 and connector 55 are connected to the top panel 50 and can be attached (e.g. clipped) to the top panel 10 when not connected to the smartphone 200 to allow storage of the cable 50 and connector 55 so the cable does not dangle relative to the top panel 10 (e.g., the cable 50 clipped by a channel or slot 11 on the edge of the top panel 10 and the connector 55 extending into a slot in a side of the top panel 10). The top panel 10 has connectors 16 via which the top panel 10 can connect to the hinge 40 when the controller 100 is assembled. The cable 50 extends at least partially through the top panel 10, for example along an edge of the top panel 10 aligned with the connectors 16. As shown in FIG. 11, the cable 50 can be routed through the hinge 40 from the top panel 10 to the electronics in the bottom panel 20.

Figure 7:
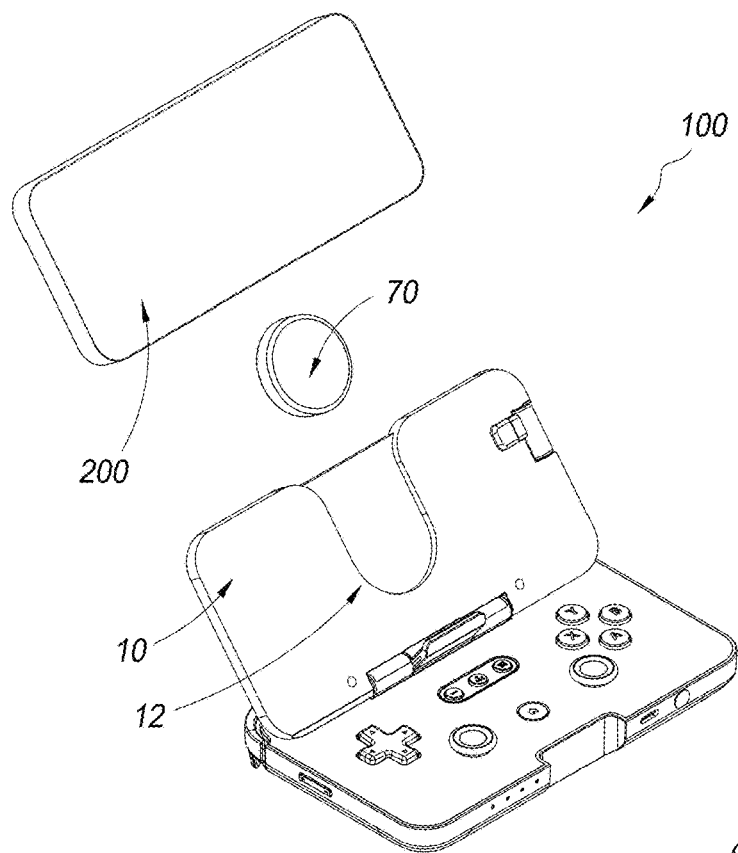
FIG. 7 is a perspective front view of the mobile video game controller of FIG. 1A with a coupling member for the smartphone.
Figure 8:
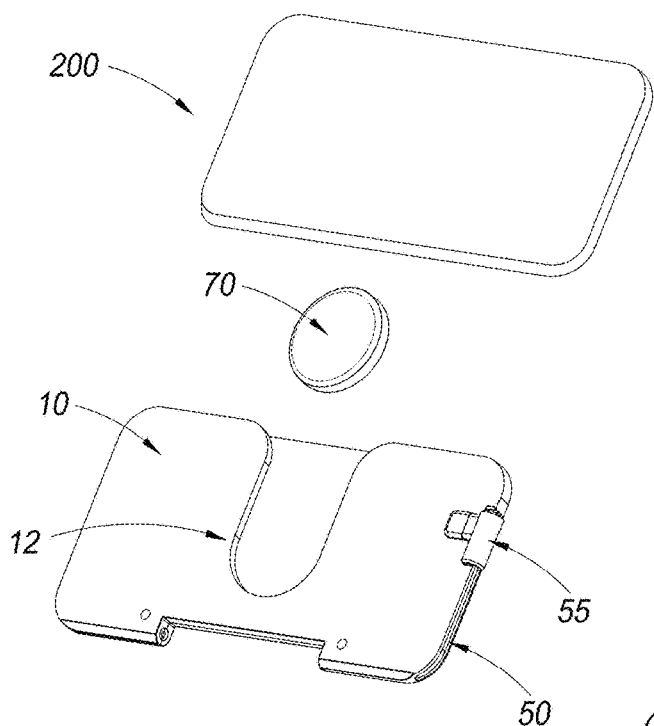
FIG. 8 is a perspective front view of a portion of the mobile video game controller of FIG. 7 with the coupling member for the smartphone.

FIGS. 7-8 show one implementation for coupling the smartphone 200 to the controller 100 (e.g., to the top panel 10). A connector 70 can be attached (e.g., adhered with an adhesive, magnetically attached) to a rear surface of the smartphone 200 or rear surface of a case of (or case attached to) the smartphone 200. In FIGS. 7-8 the connector 70 is a disc 70. The disc 70 can have a size (e.g., diameter) that allows it to fit in the slot 12 on the top panel 10 (e.g., to slide into the slot 12 between the top surface and the rear plate 14), allowing the disc 70 and therefore the smartphone 200 to be removably coupled to and retained and/or supported on the controller 100 (e.g., to the top panel 10 of the controller 100). The connector 70 can be used with any sized smartphone 200, allowing universal compatibility (e.g., universal mounting) of the controller 100 with smartphones irrespective of their size.

Figure 9:
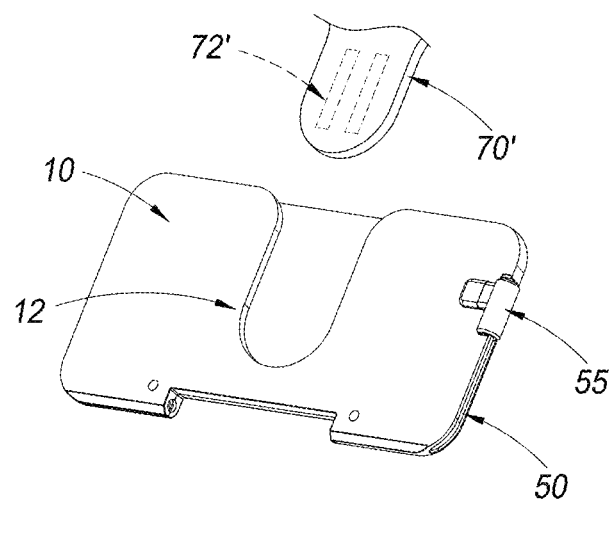
FIG. 9 is a perspective front view of a portion of the mobile video game controller of FIG. 1A with another embodiment of a coupling member for the smartphone.
Figure 10:
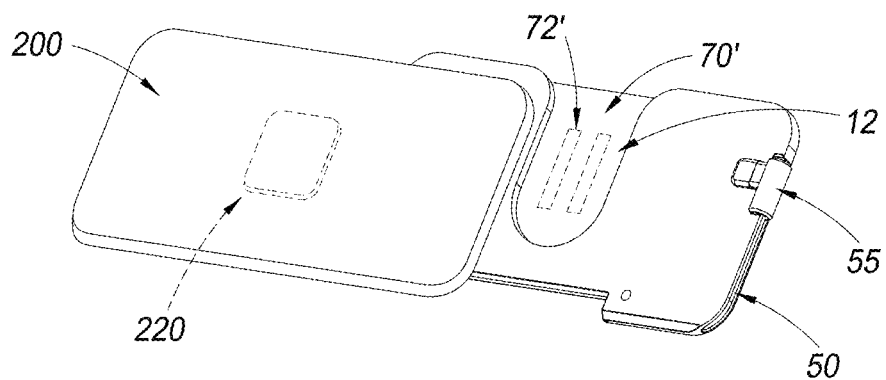
FIG. 10 is a perspective front view of a portion of the mobile video game controller of FIG. 1A with another embodiment of a coupling member for the smartphone.

FIGS. 9-10 show another implementation for coupling the smartphone 200 to the controller 100 (e.g., to the top panel 10). A connector 70' can be attached to (e.g., removably slid into) the slot 12 in the top panel 10. The connector 70' can have substantially the same shape as the slot 12 (e.g. U-shaped). The connector 70' can have one or more magnets 72' (e.g., on a surface of the connector 70'). A metal plate (e.g., a steel plate) 220 can be attached to (e.g., removably attached with an adhesive) to a rear surface of the smartphone 200 or disposed in a case of (or between the case and) the smartphone 200. The magnet(s) 72' of the connector 70' magnetically couple to the metal plate 220 when the smartphone 200 is placed adjacent the top panel 10, allowing the smartphone 200 to be removably coupled to and retained/supported on the controller 100 (e.g., to the top panel 10 of the controller 100). The connector 70 can be used with any sized smartphone 200, allowing universal compatibility (e.g., universal mounting) of the controller 100 with smartphones irrespective of their size.

FIG. 11 shows the hinge 40 connecting the top panel 10 and bottom panel 20 of the controller 100. The hinge 40 can include one or more (e.g., a pair) of friction hinge components 42. In one implementation, the hinge 40 allows the top panel 10 to be swiveled over approximately 360 degrees (e.g., so the top panel 10 can be move between a position adjacent one surface of the bottom panel 20 to another position adjacent an opposite surface of the bottom panel 20). In other implementations, the friction hinge components 42 allows the top panel 10 to be moved between one or more (e.g., multiple) fixed locations (e.g., self-supporting locations) relative to the bottom panel 20. FIG. 1B shows the top panel 10 oriented relative to the bottom panel 20 at an angle between approximately 100-160 degrees (e.g., approximately 120 degrees), allowing the user to operate the controller 100 comfortably in a gaming mode.

Figure 12:
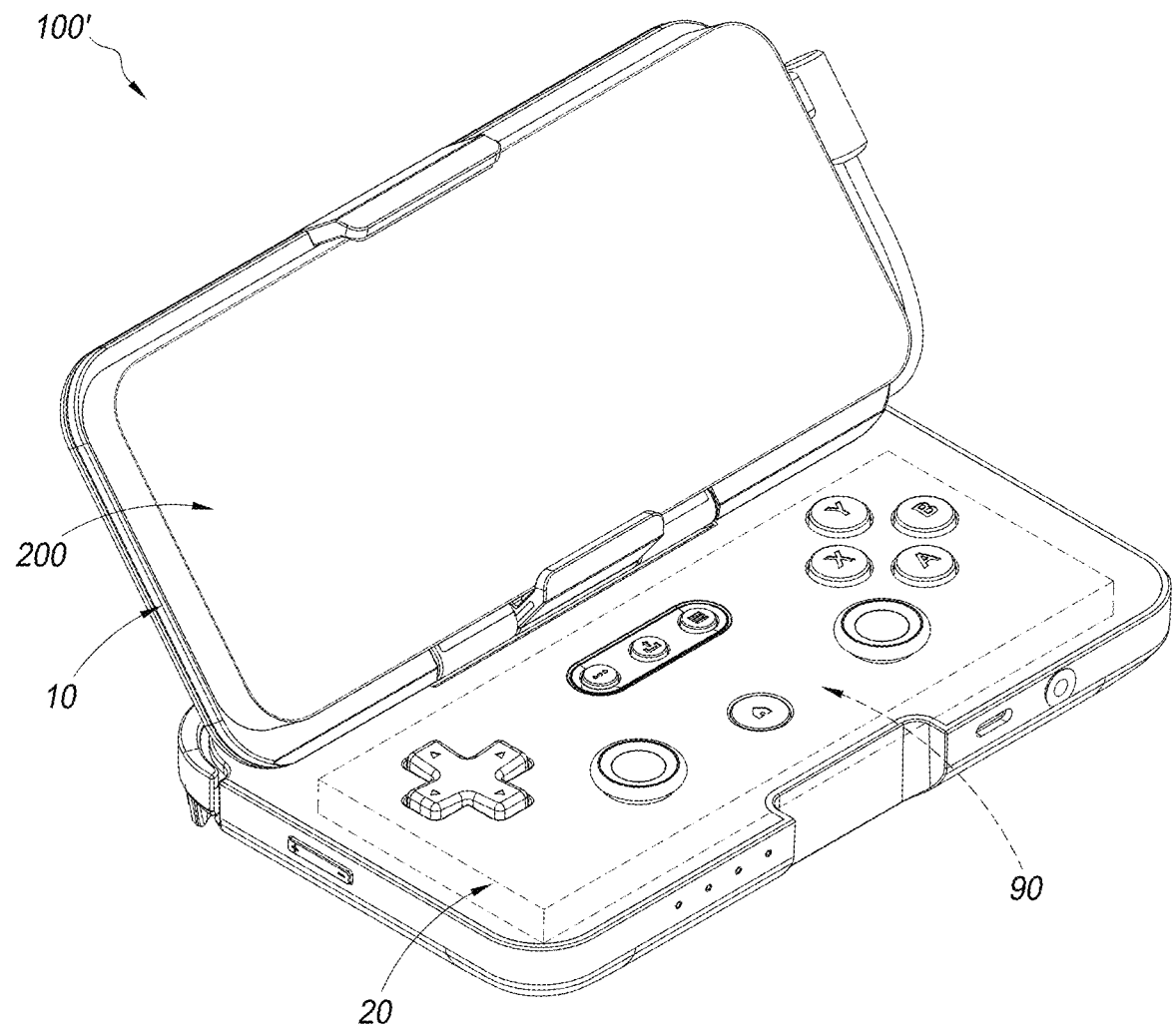
FIG. 12 is a perspective view of another embodiment of a mobile video game controller.

FIG. 12 schematically illustrates a mobile video game controller 100'. Some of the features of the controller 100' are similar to features of the controller 100 in FIGS. 1A-11. Thus, references numerals used to designate the various components of the controller 100' are identical to those used for identifying the corresponding components of the controller 100 in FIGS. 1A-11, except that a "'" has been added to the numerical identifier. Therefore, the structure and description for the various features of the controller 100 in FIGS. 1A-11 are understood to also apply to the corresponding features of the controller 100' in FIG. 12, except as described below.

The controller 100' differs from the controller 100 in that it further includes a power bank 90 having one or more batteries. The power bank 90 can deliver 5000 mAh. The power bank 90 can be used to power the electronics in the controller 100' to provide extended playing time using the controller 100' (e.g., extend playing time by 2 to 3 times). The power bank 90 can also be operated to provide power to the smartphone 200 (e.g., to charge the batteries of the smartphone 200). For example, the power bank 90 can optionally be operated to charge the smartphone 200 while the controller 100' is operated to play a video game on the smartphone 200. The controller 100' has USB power delivery via the connector 26 for charging the smartphone 200 via a cable connected to the connector 26. The controller 100' also has a charging on/off switch actuatable to operate the charging of the smartphone 200 with the power bank 90.

FIGS. 13-23 schematically illustrates a mobile video game controller 100A. Some of the features of the controller 100A are similar (e.g., identical) to features of the controller 100 in FIGS. 1A-11. Thus, references numerals used to designate the various components of the controller 100A are identical to those used for identifying the corresponding components of the controller 100 in FIGS. 1A-11, except that an "A" has been added to the numerical identifier. Therefore, the structure and description for the various features of the controller 100 in FIGS. 1A-11 are understood to also apply to the corresponding features of the controller 100A in FIGS. 13-23, except as described below.

The controller 100A differs from the controller 100 in that the top panel 10A pivots relative to the bottom panel 20A via a single hinge 40A. Additionally, the top panel 10A includes an upper bracket 12A and a lower bracket 15A for retaining the smartphone 200 on the top panel 10A, an a support 14A (e.g., support pad) for supporting rear surface of the smartphone 200. The lower bracket 15A can rotate relative to the top panel 10A between an extended position (see FIG. 18) for supporting an edge of the smartphone 200 thereon (see e.g., FIG. 13) and a stored position where the lower bracket 15A extends at least partially into recess 17A of the top panel 10A, allowing the top panel 10A to be rotated to the closed position relative to the bottom panel 20A. The upper bracket 12A is attached to a linear member 13A that is slidable (e.g. slidably moves) relative to the top panel 10A (see FIG. 18) to adjust a position of the upper bracket 12A relative to the lower bracket 15A, allowing the controller 100 to advantageously couple to the smartphone 200 irrespective of the size (e.g., width) of the smartphone 200. When the top panel 10A is moved to the closed position relative to the bottom panel 20A, the upper bracket 12A extends into a recess 21A on a front of the bottom panel 20A (allowing the top panel 10A to be positioned adjacent the bottom panel 20A in the closed position).

Figure 13:
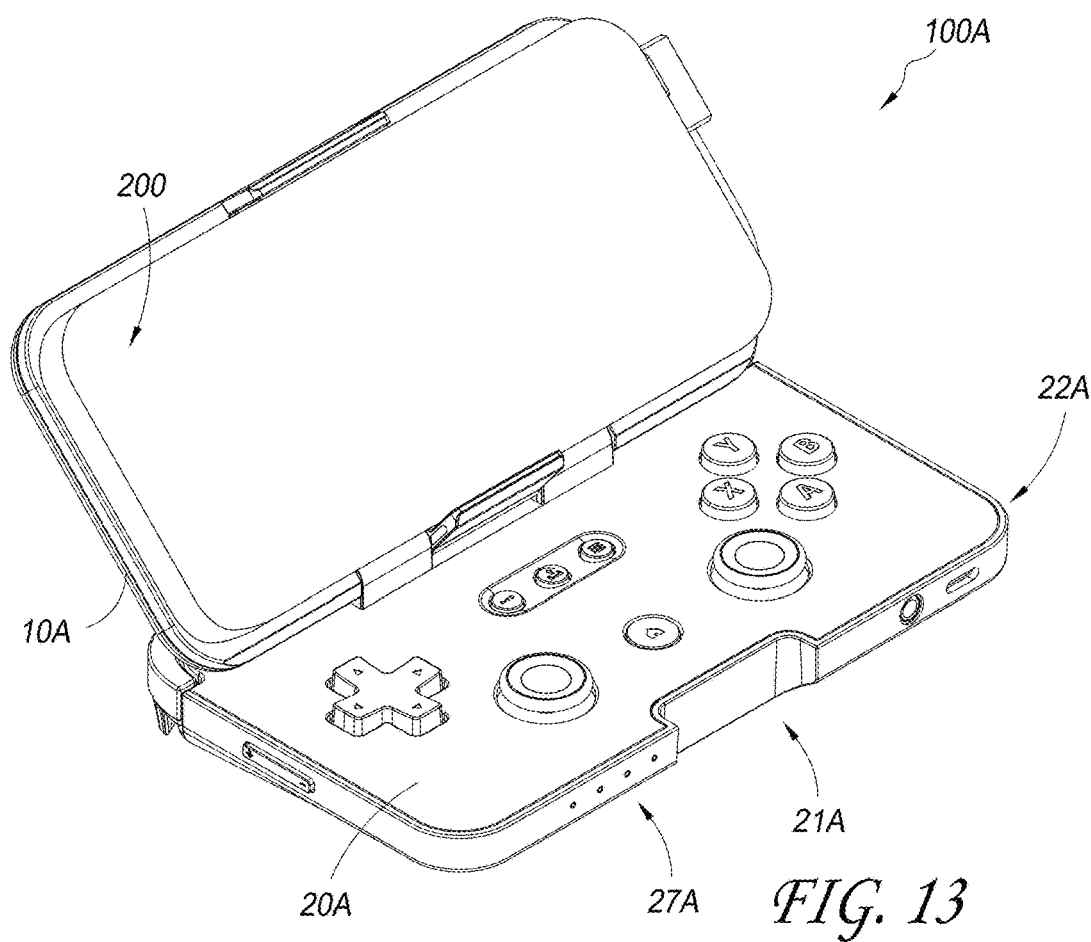
FIG. 13 is a perspective view of another embodiment of a mobile video game controller in an open position and coupled to a smartphone.

With reference to FIG. 13, the lighting elements 27A are on a front surface or edge of the bottom panel 20A. Additionally, with reference to FIG. 21, a volume control 23A is provided in the bottom panel 20A for adjusting volume control (e.g., of sound coming from the smartphone 200 when coupled to the controller 100, of sound provided to the headset via audio jack 24A when the headset cable HS is connected thereto).

Figure 14:
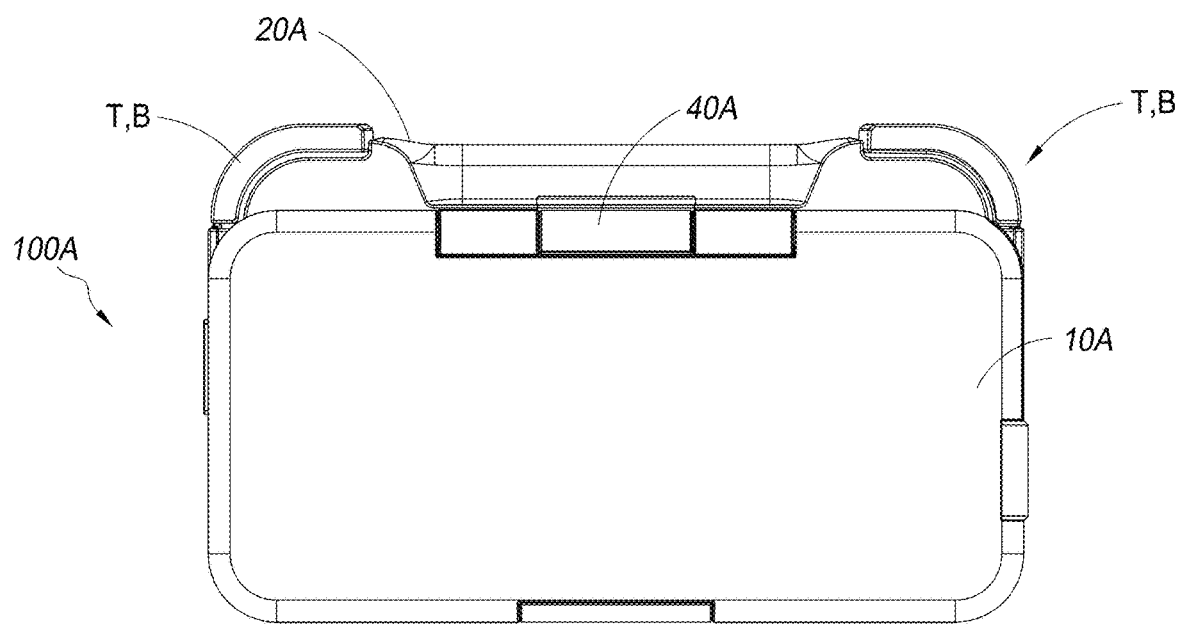
FIG. 14 is a top view of the mobile video game controller of FIG. 13 in a closed position.
Figure 15:
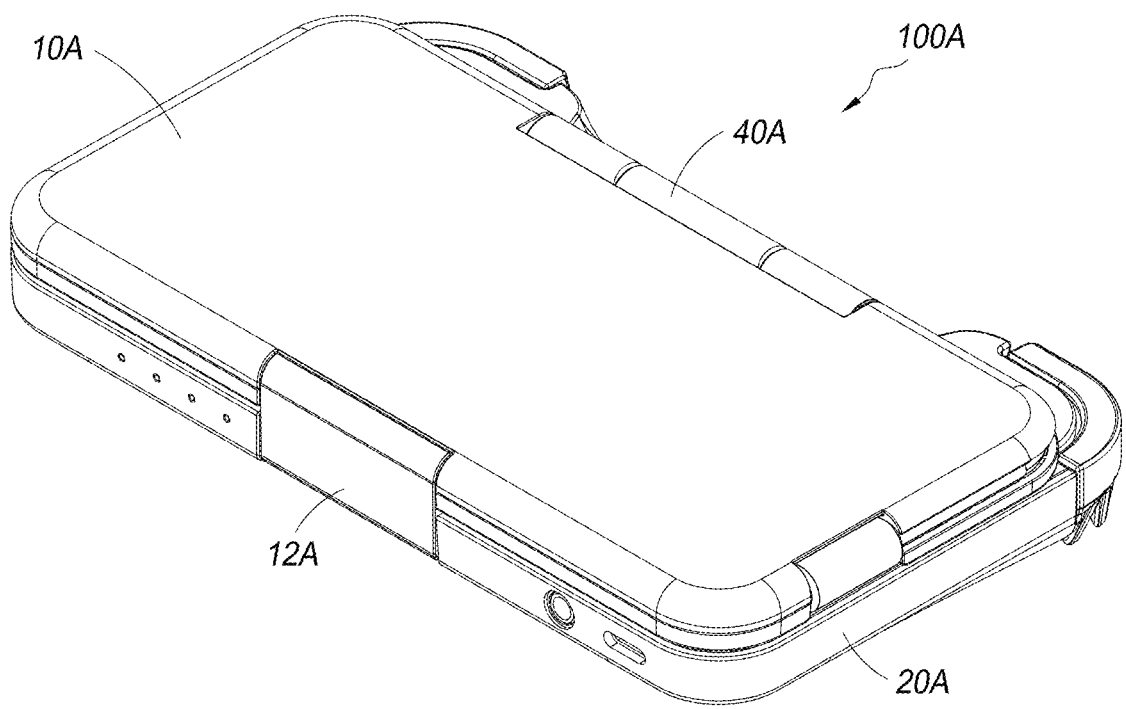
FIG. 15 is a perspective view of the mobile video game controller of FIG. 13 in the closed position.
Figure 16:
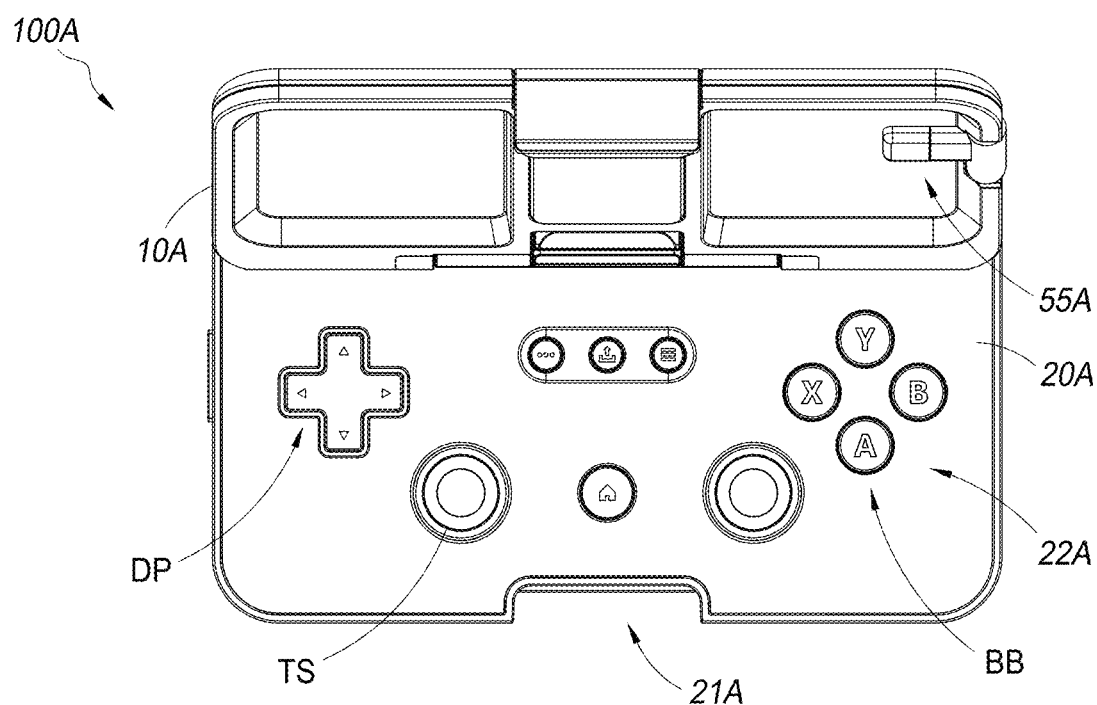
FIG. 16 is a top view of the mobile video game controller of FIG. 13 in the open position.
Figure 17:
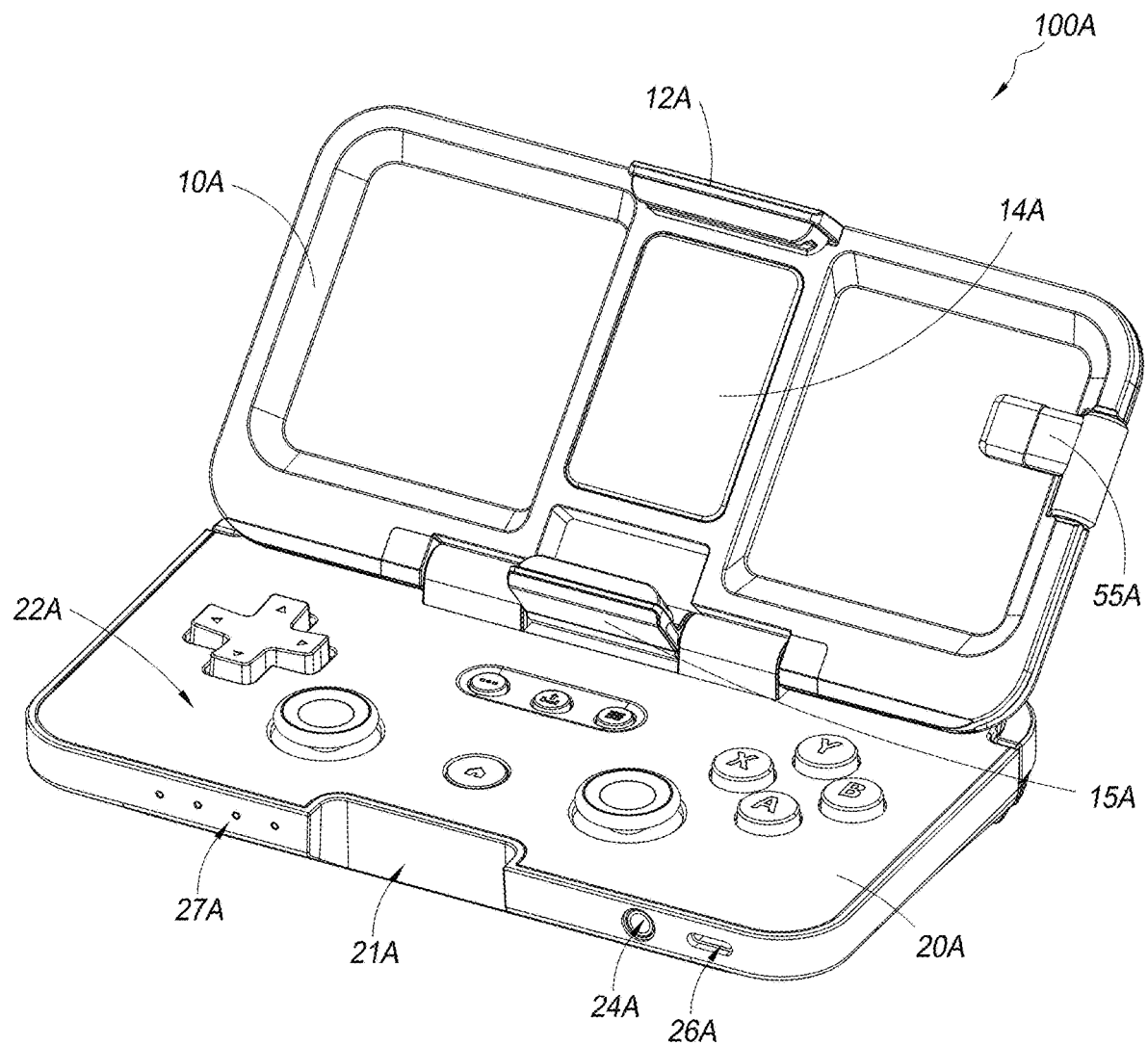
FIG. 17 is a perspective view of the mobile video game controller of FIG. 13 in the open position.
Figure 18:
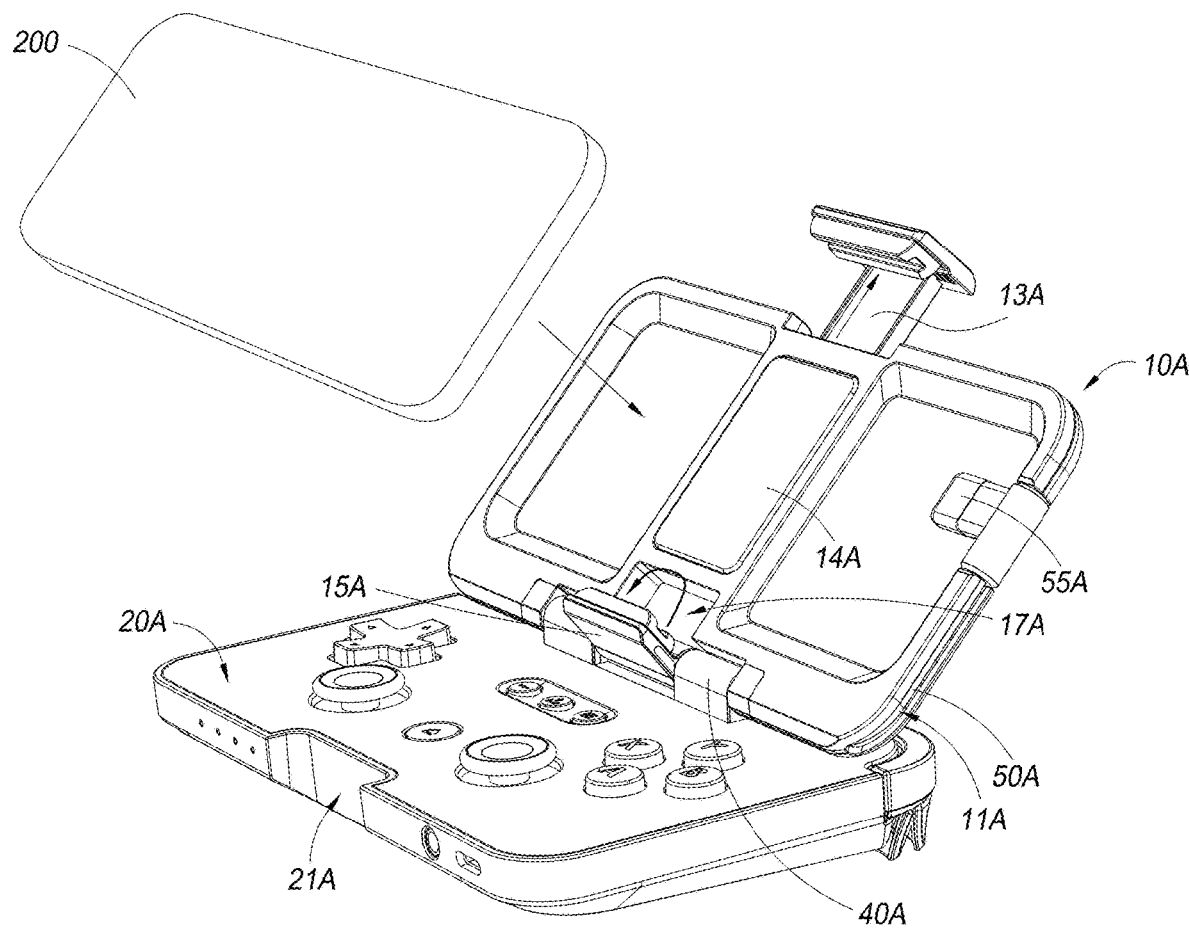
FIG. 18 is a perspective exploded view of a smartphone being coupled to the mobile video game controller of FIG. 13.
Figure 19:
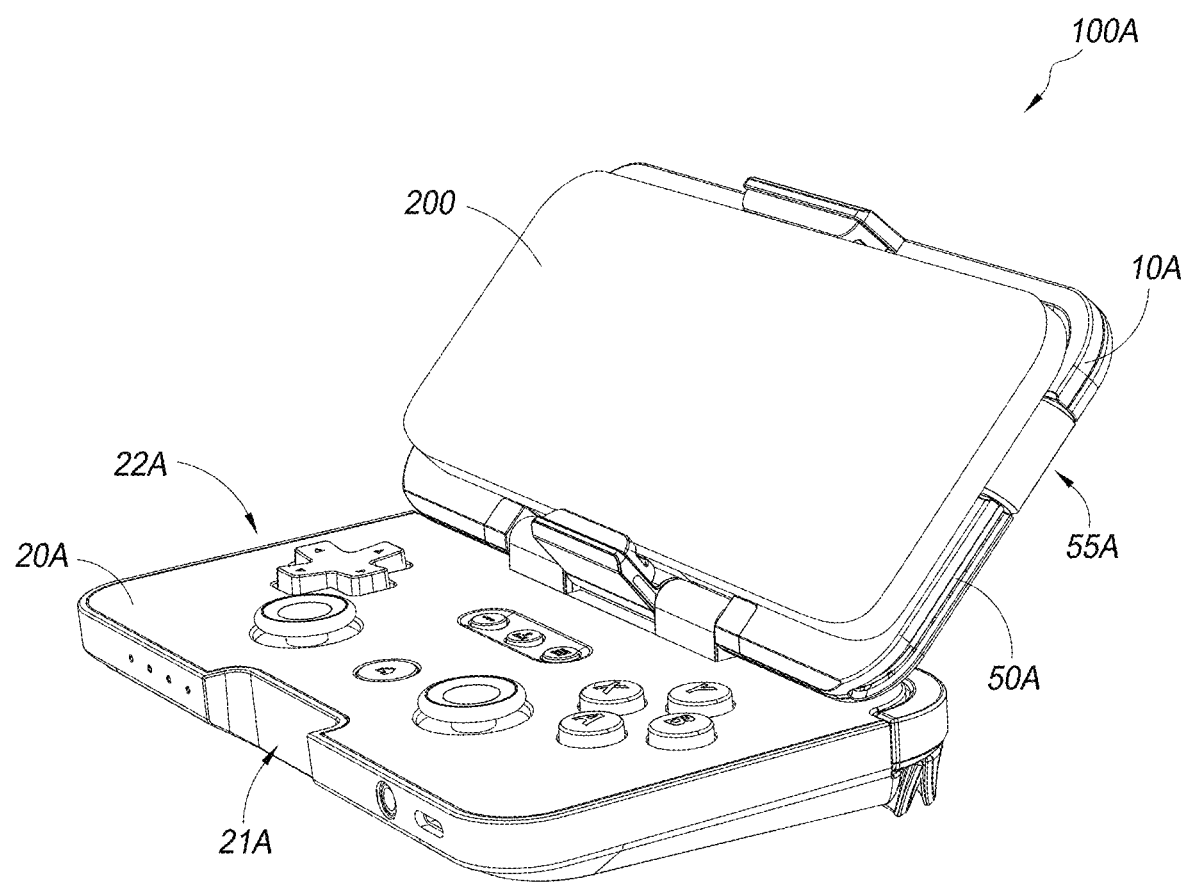
FIG. 19 is a perspective view of the mobile video game controller of FIG. 13 in the open position and coupled to a smartphone.
Figure 20:
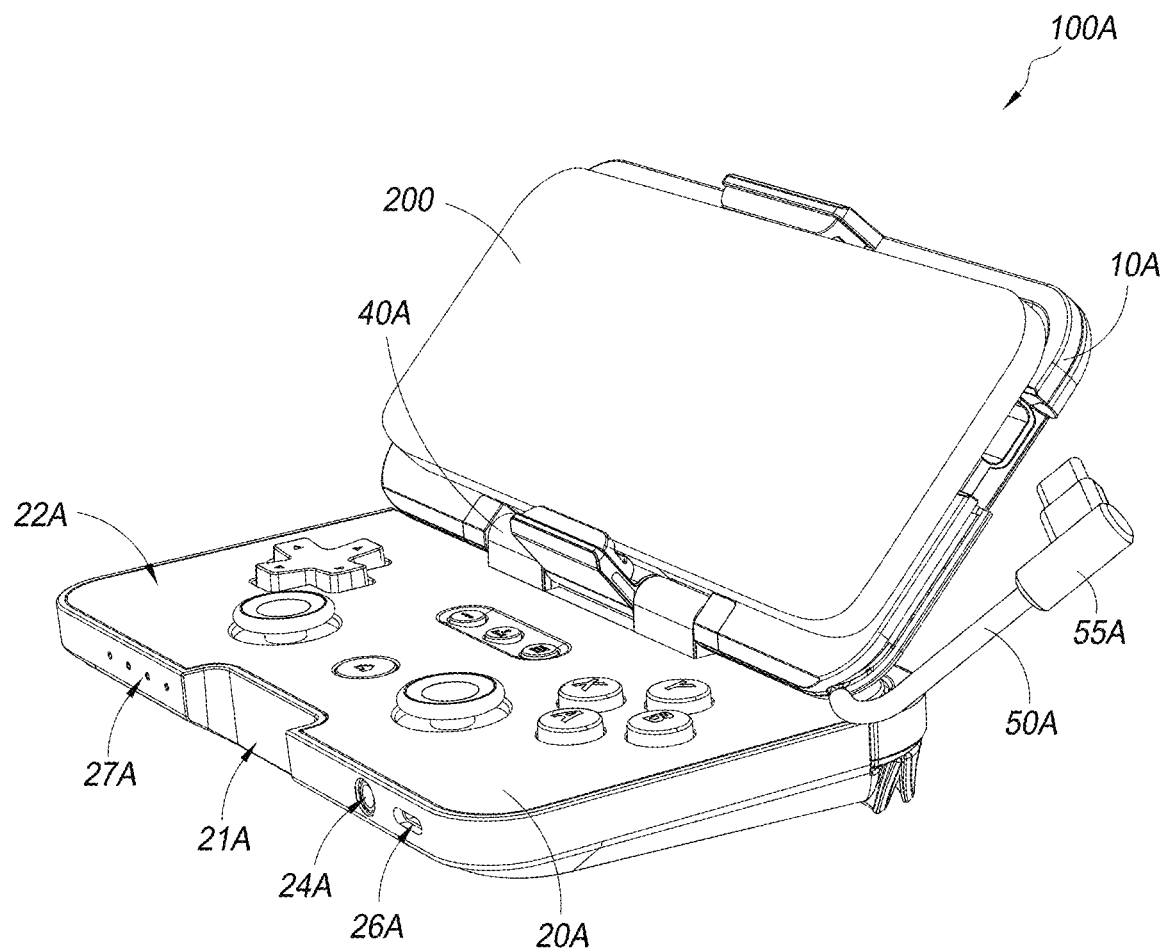
FIG. 20 is a perspective view of the mobile video game controller of FIG. 13 in the open position and coupled to a smartphone.
Figure 21:
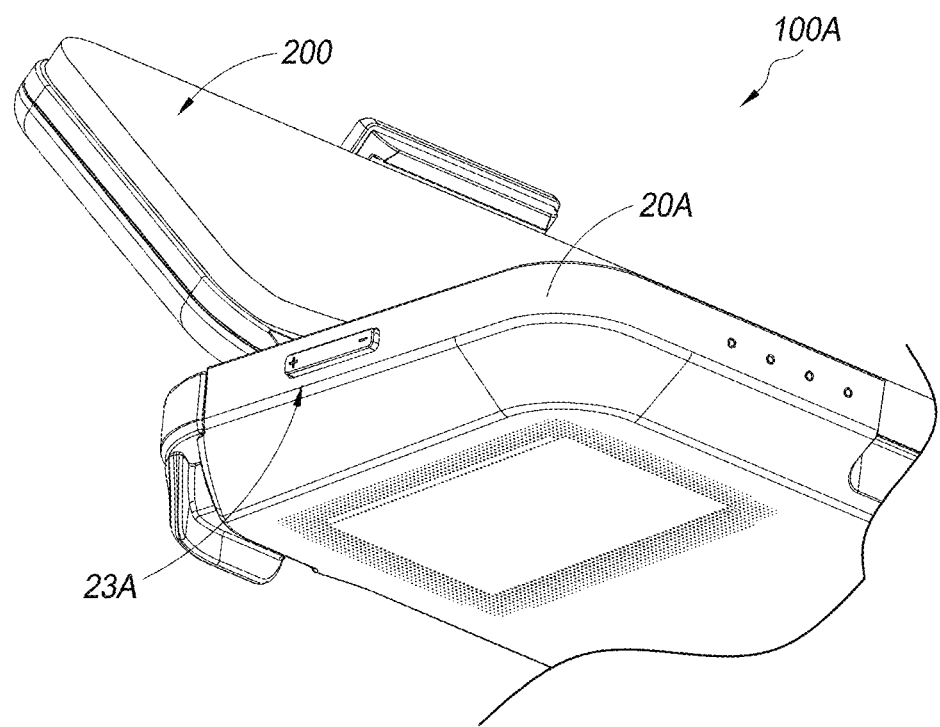
FIG. 21 is a partial side view of the mobile video game controller of FIG. 13 in the open position and with the smartphone coupled thereto.
Figure 22:
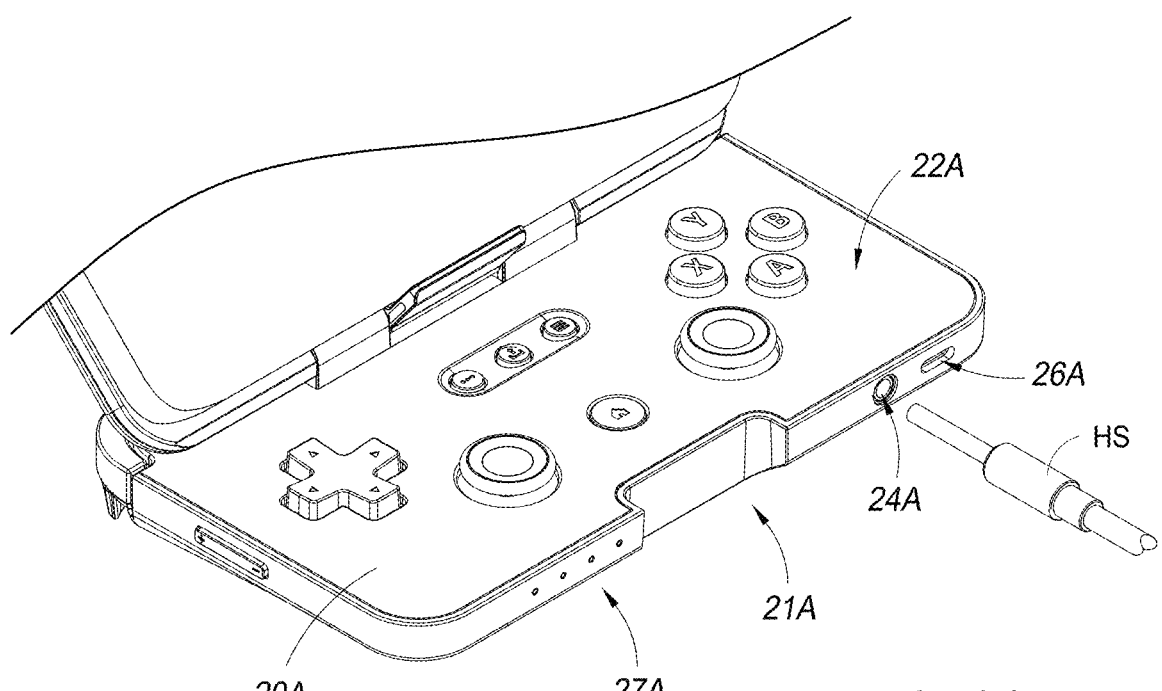
FIG. 22 is a partial perspective view of the mobile video game controller of FIG. 13 in the open position with the smartphone coupled thereto receiving an audio jack from a headset.
Figure 23:
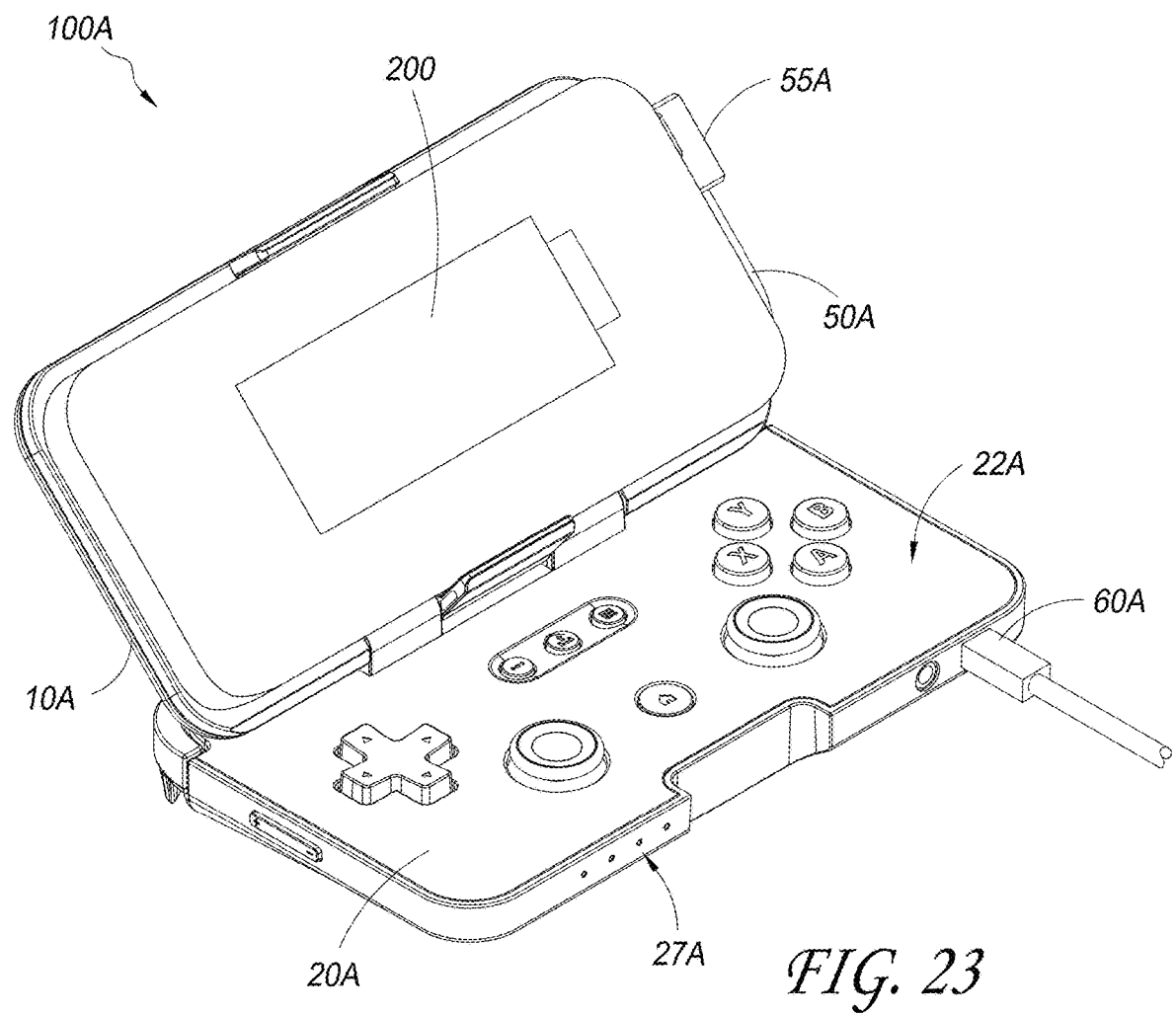
FIG. 23 is a partial perspective view of the mobile video game controller of FIG. 13 in the open position with the smartphone coupled thereto receiving a connector from a power source.
Figure 24:
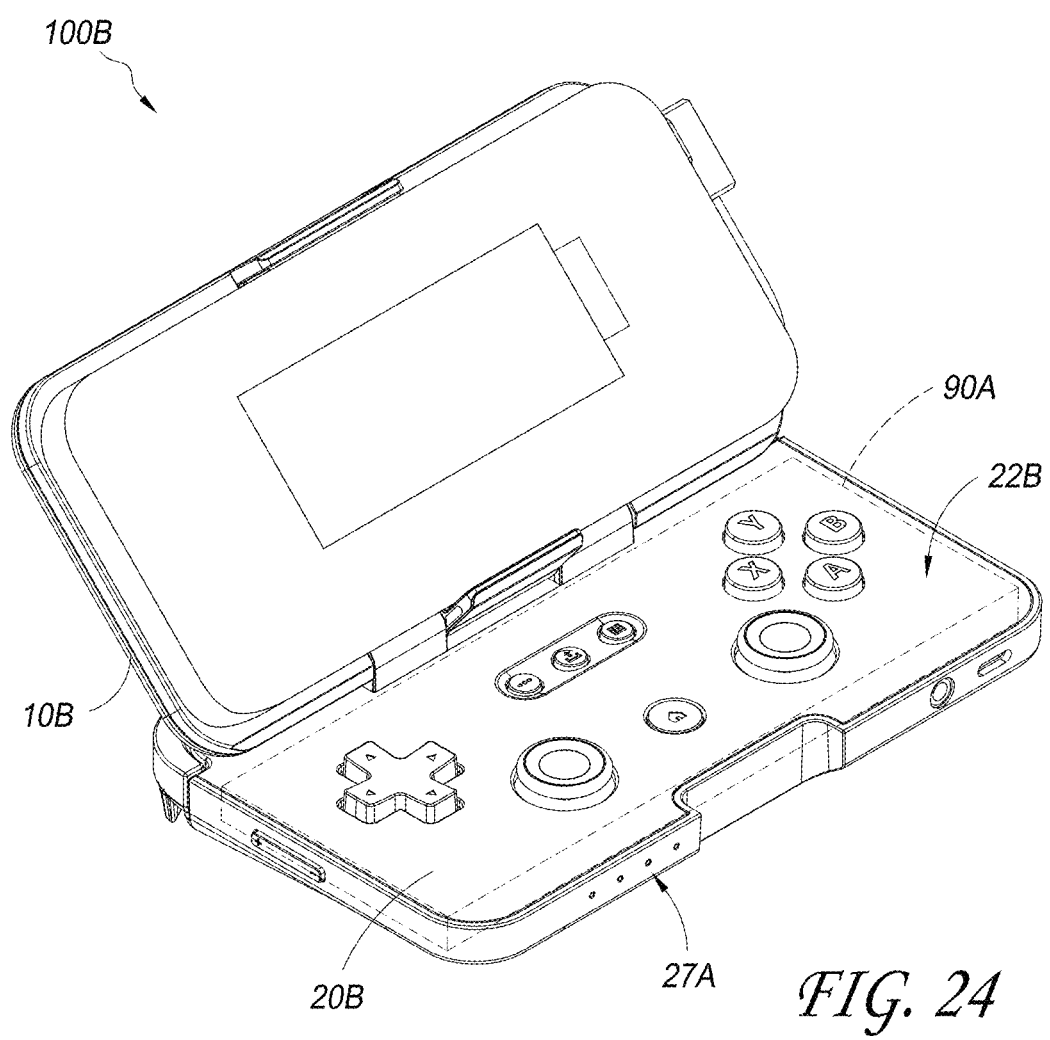
FIG. 24 is a perspective view of another embodiment of a mobile video game controller in an open position and coupled to a smartphone.

FIG. 14 schematically illustrates a mobile video game controller 100B. Some of the features of the controller 100B are similar (e.g., identical) to features of the controller 100A in FIGS. 13-23. Thus, references numerals used to designate the various components of the controller 100B are identical to those used for identifying the corresponding components of the controller 100A in FIGS. 13-23, except that a "B" has been added to the numerical identifier. Therefore, the structure and description for the various features of the controller 100A in FIGS. 13-23 are understood to also apply to the corresponding features of the controller 100B in FIG. 24, except as described below.

The controller 100B differs from the controller 100A in that it further includes a power bank 90A having one or more batteries. The power bank 90A can deliver 5000 mAh. The power bank 90A can be used to power the electronics in the controller 100B to provide extended playing time using the controller 100B (e.g., extend playing time by 2 to 3 times). The power bank 90A can also be operated to provide power to the smartphone 200 (e.g., to charge the batteries of the smartphone 200). For example, the power bank 90A can optionally be operated to charge the smartphone 200 while the controller 100B is operated to play a video game on the smartphone 200. The controller 100B has USB power delivery via the connector 26A for charging the smartphone 200 via a cable connected to the connector 26A. The controller 100B also has a charging on/off switch actuatable to operate the charging of the smartphone 200 with the power bank 90B.

ADDITIONAL EMBODIMENTS

In embodiments of the present disclosure, a mobile video game controller may be in accordance with any of the following clauses:

Clause 1. A mobile video game controller, comprising:
a controller body comprising
    a top panel configured to removably couple to a smartphone to support and retain the smartphone thereon irrespective of a size or shape of the smartphone, the top panel supporting a controller cable having a connector that removably couples to a power connector of the smartphone to electrically connect the controller to the smartphone;
    a bottom panel having
        a plurality of control inputs operable to control one or more operations of a video game,
        a processor configured to convert one or more operations of the plurality of control inputs into electrical signals and to communicate such signals to the smartphone,
        an audio jack configured to receive an audio connector for a headset and configured to communicate with the processor, and
        a power jack configured to connect to a power source via a power cable, the processor configured to pass power from the power source through to the smartphone connected to the controller cable; and
    a hinge movably connecting the top panel with the bottom panel to allow the top panel to be pivoted between a closed position relative to the bottom panel and an open position relative to the bottom panel, the controller cable routed via the hinge between the top and bottom panels to electrically connect the controller cable to the processor.

Clause 2. The mobile video game controller of any preceding clause, further comprising a power bank operable to one or both of power the electronics in the bottom panel and provide power to the smartphone to charge one or more batteries of the smartphone.

Clause 3. The mobile video game controller of any preceding clause, wherein when the controller is in a closed position where the top panel is adjacent the bottom panel, the controller has a compact form factor that allows it to be stored in a pocket of a user's garment.

Clause 4. The mobile video game controller of any preceding clause, wherein at least a portion of the connector cable is integrated into the top panel.

Clause 5. The mobile video game controller of any preceding clause, wherein the open position includes a gaming mode position with the top panel oriented at an obtuse angle of greater than 90 degrees and less than 180 degrees relative to the bottom panel.

Clause 6. The mobile video game controller of any preceding clause, wherein the plurality of control inputs include one or more of a trigger, a bumper, a joystick, a directional pad, and a button.

Clause 7. The mobile video game controller of any preceding clause, further comprising a lower bracket and an upper bracket, the upper bracket adjustable relative to the lower bracket to accommodate a smartphone therebetween irrespective of a size of the smartphone.

Clause 8. The mobile video game controller of any preceding clause wherein the lower bracket is configured to rotate about an axis of the hinge relative to a surface of the top panel between an extended position and a storage position.

Clause 9. A mobile video game controller, comprising:
a controller body comprising
    a top panel configured to removably couple to a smartphone to support and retain the smartphone thereon between an upper bracket and a lower bracket irrespective of a size or shape of the smartphone, the top panel supporting a controller cable having a connector that removably couples to a power connector of the smartphone to electrically connect the controller to the smartphone;
    a bottom panel having
        a plurality of control inputs operable to control one or more operations of a video game,
        a processor configured to convert one or more operations of the plurality of control inputs into electrical signals and to communicate such signals to the smartphone, and
        an audio jack configured to receive an audio connector for a headset and configured to communicate with the processor,
    a hinge movably connecting the top panel with the bottom panel to allow the top panel to be pivoted between a closed position relative to the bottom panel and an open position relative to the bottom panel, the controller cable routed via the hinge between the top and bottom panels to electrically connect the controller cable to the processor.

Clause 10. The mobile video game controller of any preceding clause, further comprising a power jack configured to connect to a power source via a power cable, the processor configured to pass power from the power source through to the smartphone connected to the controller cable.

Clause 11. The mobile video game controller of any preceding clause, further comprising a power bank operable to one or both of power the electronics in the bottom panel and provide power to the smartphone to charge one or more batteries of the smartphone.

Clause 12. The mobile video game controller of any preceding clause, wherein when the controller is in a closed position where the top panel is adjacent the bottom panel, the controller has a compact form factor that allows it to be stored in a pocket of a user's garment.

Clause 13. The mobile video game controller of any preceding clause, wherein at least a portion of the connector cable is integrated into the top panel.

Clause 14. The mobile video game controller of any preceding clause, wherein the open position includes a gaming mode position with the top panel oriented at an obtuse angle of greater than 90 degrees and less than 180 degrees relative to the bottom panel.

Clause 15. The mobile video game controller of any preceding clause, wherein the plurality of control inputs include one or more of a trigger, a bumper, a joystick, a directional pad, and a button.

Clause 16. The mobile video game controller of any preceding clause, wherein the upper bracket is slidable relative to the lower bracket to adjust a distance between the upper bracket and the lower bracket to accommodate the smartphone therebetween irrespective of a size of the smartphone.

Clause 17. The mobile video game controller of any preceding clause, wherein the lower bracket is configured to rotate about an axis of the hinge relative to a surface of the top panel between an extended position and a storage position.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally,"

and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the invention need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed controllers.

What is claimed is:

1. A mobile video game controller, comprising:
   a controller body comprising
      a top panel configured to removably couple to a smartphone to support and retain the smartphone thereon between an upper bracket and a lower bracket, the top panel supporting a controller cable having a connector that removably couples to a power connector of the smartphone to electrically connect the controller to the smartphone;
      a bottom panel having
         a plurality of control inputs operable to control one or more operations of a video game,
         a processor configured to convert one or more operations of the plurality of control inputs into electrical signals and to communicate such signals to the smartphone, and
         a power jack configured to connect to a power source via a power cable, the processor configured to pass power from the power source through to the smartphone connected to the controller cable; and
      a hinge movably connecting the top panel with the bottom panel to allow the top panel to be pivoted between a closed position relative to the bottom panel and an open position relative to the bottom panel, the lower bracket being configured to rotate relative to the upper bracket and configured to rotate about an axis of the hinge relative to a surface of the top panel between an extended position and a storage position, the controller cable routed via the hinge between the top and bottom panels to electrically connect the controller cable to the processor.

2. The mobile video game controller of claim 1, further comprising a power bank operable to one or both of power electronics in the bottom panel and provide power to the smartphone to charge one or more batteries of the smartphone.

3. The mobile video game controller of claim 1, wherein when the controller is in a closed position where the top panel is adjacent the bottom panel, the controller has a compact form factor that allows it to be stored in a pocket of a user's garment.

4. The mobile video game controller of claim 1, wherein at least a portion of the connector cable is integrated into the top panel.

5. The mobile video game controller of claim 1, wherein the open position includes a gaming mode position with the top panel oriented at an obtuse angle of greater than 90 degrees and less than 180 degrees relative to the bottom panel.

6. The mobile video game controller of claim 1, wherein the plurality of control inputs include one or more of a trigger, a bumper, a joystick, a directional pad, and a button.

7. The mobile video game controller of claim 1, wherein the upper bracket is adjustable relative to the lower bracket to accommodate a smartphone therebetween irrespective of a size of the smartphone.

8. A mobile video game controller, comprising:
   a controller body comprising
      a top panel configured to removably couple to a smartphone to support and retain the smartphone thereon between an upper bracket and a lower bracket irrespective of a size or shape of the smartphone, the upper bracket is slidable relative to the lower bracket to adjust a distance between the upper bracket and the lower bracket to accommodate the smartphone therebetween irrespective of a size of the smartphone, the top panel supporting a controller cable having a connector that removably couples to a power connector of the smartphone to electrically connect the controller to the smartphone;
      a bottom panel having
         a plurality of control inputs operable to control one or more operations of a video game, and
         a processor configured to convert one or more operations of the plurality of control inputs into electrical signals and to communicate such signals to the smartphone,
      a hinge movably connecting the top panel with the bottom panel to allow the top panel to be pivoted between a closed position relative to the bottom panel and an open position relative to the bottom panel, the lower bracket being configured to rotate relative to the upper bracket and configured to rotate about an axis of the hinge relative to a surface of the top panel between an extended position and a storage position, the controller cable routed via the hinge between the top and bottom panels to electrically connect the controller cable to the processor.

9. The mobile video game controller of claim 8, further comprising a power jack configured to connect to a power source via a power cable, the processor configured to pass power from the power source through to the smartphone connected to the controller cable.

10. The mobile video game controller of claim 8, further comprising a power bank operable to one or both of power electronics in the bottom panel and provide power to the smartphone to charge one or more batteries of the smartphone.

11. The mobile video game controller of claim 8, wherein when the controller is in a closed position where the top panel is adjacent the bottom panel, the controller has a compact form factor that allows it to be stored in a pocket of a user's garment.

12. The mobile video game controller of claim 8, wherein at least a portion of the connector cable is integrated into the top panel.

13. The mobile video game controller of claim 8, wherein the open position includes a gaming mode position with the top panel oriented at an obtuse angle of greater than 90 degrees and less than 180 degrees relative to the bottom panel.

14. The mobile video game controller of claim 8, wherein the plurality of control inputs include one or more of a trigger, a bumper, a joystick, a directional pad, and a button.

\* \* \* \* \*